(12) United States Patent
Wang

(10) Patent No.: US 11,838,829 B2
(45) Date of Patent: Dec. 5, 2023

(54) SYSTEMS AND METHODS FOR INTELLIGENT AUDIO OUTPUT

(71) Applicant: Rovi Guides, Inc., San Jose, CA (US)

(72) Inventor: Ti-Shiang Wang, Lexington, MA (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 17/970,737

(22) Filed: Oct. 21, 2022

(65) Prior Publication Data

US 2023/0040361 A1 Feb. 9, 2023

Related U.S. Application Data

(63) Continuation of application No. 17/485,685, filed on Sep. 27, 2021, now Pat. No. 11,503,430, which is a continuation of application No. 16/902,521, filed on Jun. 16, 2020, now Pat. No. 11,159,912, which is a continuation of application No. 16/524,945, filed on Jul. 29, 2019, now Pat. No. 10,721,591, which is a continuation of application No. 15/989,645, filed on May 25, 2018, now Pat. No. 10,419,879, which is a continuation of application No. 15/215,168, filed on Jul. 20, 2016, now Pat. No. 10,064,009.

(51) Int. Cl.
| | |
|---|---|
| H04W 4/02 | (2018.01) |
| H04L 67/306 | (2022.01) |
| H04H 60/33 | (2008.01) |
| H04W 4/48 | (2018.01) |
| H04H 60/16 | (2008.01) |
| H04H 60/52 | (2008.01) |
| H04L 67/06 | (2022.01) |
| H04L 67/12 | (2022.01) |

(52) U.S. Cl.
CPC ............ *H04W 4/023* (2013.01); *H04H 60/16* (2013.01); *H04H 60/33* (2013.01); *H04H 60/52* (2013.01); *H04L 67/06* (2013.01); *H04L 67/306* (2013.01); *H04W 4/48* (2018.02); *H04L 67/12* (2013.01)

(58) Field of Classification Search
None
See application file for complete search history.

(56) References Cited

U.S. PATENT DOCUMENTS

| | | | |
|---|---|---|---|
| 10,064,009 B2 | 8/2018 | Wang | |
| 10,064,010 B2 | 8/2018 | Wang | |
| 10,419,879 B2 | 9/2019 | Wang | |
| 10,721,591 B2 | 7/2020 | Wang | |
| 11,159,912 B2 | 10/2021 | Wang | |
| 2002/0077984 A1 | 6/2002 | Ireton | |
| 2008/0130922 A1* | 6/2008 | Shibata | H04R 5/023 381/1 |
| 2013/0295913 A1 | 11/2013 | Matthews et al. | |
| 2014/0007154 A1* | 1/2014 | Seibold | H04N 21/454 725/25 |

(Continued)

*Primary Examiner* — Frantz Bataille
(74) *Attorney, Agent, or Firm* — HALEY GUILIANO LLP

(57) ABSTRACT

Systems and methods for a media guidance application that adjusts output parameters of media assets delivered to output devices based on user preferences of users near the output devices. For example, the media guidance application may adjust the volume to be higher at a speaker near a first user who enjoys a particular media asset and lower at a speaker near a second user who dislikes the media asset.

20 Claims, 9 Drawing Sheets

(56) References Cited

U.S. PATENT DOCUMENTS

| | | |
|---|---|---|
| 2014/0115625 A1* | 4/2014 | McCoy ............ H04N 21/23424 |
| | | 725/34 |
| 2014/0181910 A1 | 6/2014 | Fingal et al. |
| 2014/0279889 A1 | 9/2014 | Luna |
| 2016/0316343 A1 | 10/2016 | Kan et al. |
| 2016/0345062 A1* | 11/2016 | Klappert ............... H04L 67/306 |
| 2017/0223088 A1 | 8/2017 | Patel |
| 2020/0314591 A1 | 10/2020 | Wang |
| 2022/0014873 A1 | 1/2022 | Wang |

\* cited by examiner

800 ...
801 Initialization Subroutine determine a first user is at a first position and that a second user is at a second position
802 ...
803 //Routine to determine that the first position corresponds to a first output device and the second position corresponds to a second output device
804 ...
805 Receive a first user preference of the first user and a second user preference of a second user;
806 ...
807 Receive a media asset;
808 ...
809 //Routine to determine whether to present the media asset to the first user based on the first user preference corresponding to a characteristic of the media asset
810 ...
811 //Routine to determine whether the second user preference corresponds to the characteristic of the media asset
812 ...
813 For each media asset:
814     Store boolean A = whether the first user preference corresponds to the characteristic of the media asset;
815     Store boolean B = whether the second user preference corresponds to the characteristic of the media asset;
816     If A == True, then:
817         Execute Subroutine to adjust an output parameter for the first output device
818     If B == True, then:
819         Execute Subroutine to adjust the output parameter for the second output device
820 ....
821 Termination Subroutine

FIG. 8

```
1000 ...
1001 Initialization Subroutine determine a first user are both associated with a first
       output device of a first output device type
1002 ...
1003 Receive a first user preference of the first user and a second user preference of a
       second user;
1004 ...
1005 Receive a media asset;
1006 ...
1007 //Routine to determine whether to present the media asset to the first user based
       on the first user preference corresponding to a characteristic of the media asset
1008 ...
1009 //Routine to determine whether the second user preference corresponds to the
       characteristic of the media asset
1010 ...
1011 For each media asset:
1012     Store boolean A = whether the first user preference corresponds to the
       characteristic of the media asset;
1013     Store boolean B = whether the second user preference corresponds to the
       characteristic of the media asset;
1014 If A == True && B == False, then:
1015           Execute Subroutine to generate an alert notifying the first user to
                 access a second output device to access the media asset
1016 If A == True && B == True, then:
1017           Execute Subroutine to adjust the output parameter for the first
                 output device
1018 ....
1019 Termination Subroutine
```

FIG. 10

SYSTEMS AND METHODS FOR INTELLIGENT AUDIO OUTPUT

CROSS-REFERENCE TO RELATED APPLICATIONS

This application is a continuation of U.S. patent application Ser. No. 17/485,685, filed Sep. 27, 2021, which is a continuation of U.S. patent application Ser. No. 16/902,521 (now U.S. Pat. No. 11,159,912), filed Jun. 16, 2020, which is a continuation of U.S. patent application Ser. No. 16/524,945 (now U.S. Pat. No. 10,721,591), filed Jul. 29, 2019, which is a continuation of U.S. patent application Ser. No. 15/989,645 (now U.S. Pat. No. 10,419,879), filed May 25, 2018, which is a continuation of U.S. application Ser. No. 15/215,168 (now U.S. Pat. No. 10,064,009), filed Jul. 20, 2016, the disclosures of which are hereby incorporated by reference herein in their entireties.

BACKGROUND

Even with the plethora of media content available to consumers today, it still can be difficult to find media content that multiple users enjoy. One approach of conventional systems has been to provide group recommendations based on pooled media content preferences from a plurality of users. However, while these group recommendation engines output media assets that may be preferred by many users of a group of users, some users may not prefer the selected media asset and still have to watch and/or listen to it. This is especially troublesome in closed environments, such as a car or a room, where the user may be located close to an output device playing the media asset. Furthermore, in some instances, a user may have the opposite problem and wish to hear the media asset, but they are located far away from the nearest output device.

SUMMARY

Accordingly, systems and methods are disclosed herein for a media guidance application that adjusts output parameters of media assets delivered to output devices based on user preferences of users near the output devices. For example, the media guidance application may adjust the volume to be higher at a speaker near a first user who enjoys a particular media asset and lower at a speaker near a second user who dislikes the media asset. As another example, the media guidance application may determine that a user enjoys a media asset, but is too far from an output device to view or listen to the media asset or that other users do not enjoy the media asset. In this instance, the media guidance application may alert the user to use a different output device type to view and/or listen to the media asset (e.g., on a mobile phone). By adjusting the output of devices near users based on their individual preferences, the present systems and methods can optimize each user's enjoyment of the same media asset in a shared listening and/or viewing experience.

In some aspects, the media guidance application may determine a first user is at a first position, where the first position corresponds to a first output device. For example, the media guidance application may receive an indication from a radio-frequency identification ("RFID") reader in the rear driver side door of a car that it has detected an RFID chip corresponding to a user. The media guidance application may then determine that since the user is seated in the rear driver side seat of the car, the user's position corresponds to a speaker in the rear driver side door.

The media guidance application may determine that a second user is at a second position that corresponds to a second output device. For example, the media guidance application may receive an indication that a device associated with a second user is connected to a port located near the front passenger side seat of a car. The media guidance application may then determine that since the second user is seated in the front passenger side seat, the second user's position corresponds to a speaker in the front passenger side seat door.

The media guidance application may then receive a first user preference of the first user and a second user preference of a second user. For example, the media guidance application may receive a first user preference for music by the artist, "Justin Bieber," and a second user preference for music by the artist, "Miles Davis." Likewise, the media guidance application may receive, from a second user input by the second user, the second user preference. For example, the media guidance application may receive a user input from a touch screen on a mobile device that the first user prefers "classic rock" songs. Likewise, the media guidance application may receive a user input from a keypad of a mobile device that the second user prefers "hip-hop" songs. Alternatively or additionally, the media guidance application may access a first user profile associated with the first user and a second user profile associated with the second user. For example, the media guidance application may access the profiles on a website based on a link to the website associated with each user stored in storage. The media guidance application may then retrieve the first user preference from the first user profile and the second user preference from the second user profile. For example, the media guidance application may retrieve the user preference of the first and second user from posts on their respective user profiles.

The media guidance application may receive a media asset. For example, the media guidance application may receive the song, "Sorry," by Justin Bieber from a content provider such as a radio broadcaster or an on-line streaming media provider. For example, the media guidance application may be implemented on a car audio system or other user device that outputs audio content via one or more speakers, and receive one or more media assets for presentation to a group of users.

The media guidance application may then determine whether to present the media asset to the first user based on the first user preference corresponding to a characteristic of the media asset. For example, the media guidance application may determine that the received media asset, "Sorry," is a song by artist "Justin Bieber" (i.e., a characteristic of the media asset). The media guidance application may then determine based on character matching or other means of comparing two strings of text that the characteristic (e.g., "Justin Bieber") matches the user preference (e.g., music by the artist "Justin Bieber"). Likewise, the media guidance application may determine whether the second user preference corresponds to the characteristic of the media asset. For example, the media guidance application may determine that the received media asset, "Sorry" is a song by artist "Justin Bieber" (i.e., a characteristic of the media asset). The media guidance application may then determine based on character matching or other means of comparing two strings of text that the characteristic (e.g., "Justin Bieber") does not match the user preference (e.g., music by the artist "Miles Davis").

In some embodiments, to determine whether to present the media asset to the first user based on the first user preference corresponding to a characteristic of the media asset, the media guidance application may receive metadata from a content source for the media asset. For example, the media guidance application may receive metadata for an upcoming song on the station "FM93.1, Current Pop Hits." The media guidance application may then compare the metadata for the media asset to the first user preference. For example, the metadata may include characteristics of the upcoming song, such as the title and artist. The media guidance application may compare this to the user preference, for example, "Bon Jovi." The media guidance application may then determine whether the metadata for the media asset matches the first user preference. For example, the media guidance application may determine that since the artist of the song is not "Bon Jovi," the media asset does not match the first user preference.

Furthermore, in some embodiments, when determining to present the media asset to the first user based on whether the first user preference corresponds to the characteristic of the media asset, the media guidance application may compare the characteristic of the media asset with the first user preference. For example, the media guidance application may compare the user preference for "rock" music to characteristics of the media asset, like the title and genre of the media asset. The media guidance application may, based on comparing the characteristic of the media asset with the first user preference, assign a first similarity value for the media asset and the first user preference. For example, the media guidance application may determine that the user preference for "rock" corresponds to a similarity rating of 9 out of 10 for the song, "Smoke on the Water." The media guidance application may compare the first similarity value to a threshold similarity value. For example, the media guidance application may compare the 9 out of 10 similarity to a threshold similarity for presenting the media asset, such as 7 out of 10. The media guidance application may, in response to determining the first similarity value exceeds the threshold similarity value, determine to present the media asset to the first user. For example, since 9 is greater than 7, the media guidance application may determine to present "Smoke on the Water" to the first user.

The media guidance application may, in response to both determining to present the media asset to the first user and determining that the first user is at the first position, determine to adjust an output parameter for the media asset at the first output device. For example, upon determining that the user likes songs by Justin Bieber and "Sorry" is a song by Justin Bieber, and that the user is seated in the rear driver side seat, the media guidance application may increase the volume of the rear driver side speaker to be louder so that the user can enjoy the song. Alternatively, the media guidance application may, in response to both determining that the second user preference does not correspond to presenting the media asset and determining that the second user is at the second position, determine not to adjust the output parameter for the media asset at the second output device. For example, upon determining that the user does not have a preference for songs by Justin Bieber since "Miles Davis" is a different artist, and that the user is seated in the front passenger side seat, the media guidance application may determine not to increase the volume of the front passenger seat speaker, since the user has no preference for the song, "Sorry." Thus, by adjusting the output parameter of a media asset selected from the pooled user preferences of users (e.g., passengers in a car) based on each individual user's preferences, the media guidance application enhances a user's enjoyment of media assets he or she likes, while minimizing a user's displeasure from media assets he or she dislikes.

The media guidance application may adjust numerous different output parameters. In some embodiments, the media guidance application may determine the output parameter is a volume increase of the media asset. For example, the media guidance application may maintain a stored list of output parameters for different output devices and their current values and determine based on user preferences to adjust certain values, such as increasing the volume. The media guidance application may determine an amount of the volume increase based on the first user preference. For example, the media guidance application may determine that since a user expresses a particularly strong interest in the media asset, "Sorry" to increase the volume by 20 dB. The media guidance application may transmit to the first output device an indication of the amount of volume increase. For example, the media guidance application may transmit a data packet to a receiver or amplifier to increase the volume for the speaker near the first user by 20 dB.

In some embodiments, the media guidance application may determine the output parameter is a version of the media asset. For example, the media guidance application may maintain a stored list of current values associated with output parameters for different output devices and determine based on user preferences to adjust certain values, such as whether media assets containing inappropriate content should be presented. The media guidance application may determine from the characteristic of the media asset that the media asset contains inappropriate content. For example, the media guidance application may determine a media asset contains a Boolean for inappropriate content assigned a value "true." The media guidance application may, based on the first user preference, request the alternate version of the media asset to transmit to the first output device. For example, if the first user preference is for censored media assets, the media guidance application may request a censored version of the media asset (e.g., from the content source) to output for the first user.

In addition to the techniques discussed above, the media guidance application may determine the position in a number of ways. For example, the media guidance application may receive a location of the first user and use the location to determine the first position. For example, the media guidance application may receive an indication from a pressure sensor that a user is sitting in the rear middle seat of a car, which may be assigned a value "4," based on the driver's position being "1" and moving clockwise around the car. The media guidance application may access a database containing a plurality of output devices and positions corresponding to each of the plurality of output devices, where the database includes the first position of the first output device and the second position of the second output device. For example, the media guidance application may access a database organized as a table where each row contains a different output device and each column contains coordinates and/or indicators of position of each output device.

In another example, the media guidance application may receive a packet containing information relating to the first user. For example, the media guidance application receive a data packet containing a string user_ID="John123," and a string location="backseat." The media guidance application may analyze the information contained in the packet to determine an identity of the first user and the location of the first user. For example, the media guidance application may analyze the variables received in the data packet and determine that John is sitting in the backseat of a car.

The media guidance application may retrieve a first value for the first position from a first field in the database and a second value for the second position from a second field in the database. For example, the media guidance application may retrieve information that "speaker 1," which corresponds to the rear driver side door, has a value of "5" and that "speaker 2," which corresponds to the front passenger side door, has a value of "2." The media guidance application may compare the first value and the second value to the location of the first user. For example, the media guidance application may compare the retrieved values "2" and "5" to "4." The media guidance application may determine that the first value corresponds to a shorter distance to the location of the first user. For example, the media guidance application may determine based on a rule-set that the first user is located closer to the rear driver side door.

In some embodiments, the media guidance application generates for display an indication of an upcoming media asset. For example, the media guidance application may display on a screen in the dashboard of a car text that "Roar, by Katy Perry" is starting soon. The media guidance application may receive a first indication of interest from the first user in the upcoming media asset as the first user preference. For example, the media guidance application may receive a user selection of a "thumbs-up" icon on the screen of a mobile device indicating that the first user is interested in the media asset. The media guidance application may receive a second indication of interest from the second user in the upcoming media asset as the second user preference. For example, the media guidance application may receive a user selection of a "thumbs-down" icon on the screen of a mobile device indicating that the second user is not interested in the media asset.

In some aspects, the media guidance application may determine a first user and a second user are both associated with a first output device, where the first output device has a first output device type. The first output device type may be integrated speakers or integrated display screens in a car, room, or other location. For example, the media guidance application may receive an indication from an RFID reader in the rear driver side door of a car that it has detected an RFID chip corresponding to the first user. The media guidance application may then determine that since the user is seated in the rear driver side seat of the car, the user's position corresponds to a speaker in the rear driver side door. The media guidance application may also receive an indication that a device associated with the second user is connected to a port located near the rear driver side door of a car. The media guidance application may then determine that since the second user is located near the rear driver side door, the second user's position corresponds to the same speaker in the rear driver side seat door.

The media guidance application may then receive a first user preference of the first user and a second user preference of a second user. For example, the media guidance application may receive a first user preference for music of the genre, "Pop," and a second user preference for music of the genre, "Big Band." Likewise, the media guidance application may receive, from a first user input by the first user, the first user preference. For example, the media guidance application may receive a user input from a touch screen on a mobile device that the first user prefers "90s" songs. Similarly, the media guidance application may receive, from a second user input by the second user, the second user preference. For example, the media guidance application may receive a user input from a keypad of a mobile device that the second user prefers "70s" songs. Alternatively or additionally, the media guidance application may access a first user profile associated with the first user and a second user profile associated with the second user. For example, the media guidance application may access the profiles on a website based on a link to the website associated with each user stored in storage. The media guidance application may then retrieve the first user preference from the first user profile and the second user preference from the second user profile. For example, the media guidance application may retrieve the user preference of the first and second user from posts on their respective user profiles.

The media guidance application may receive a media asset. For example, the media guidance application may receive the song, "Roar" by Katy Perry from a content provider such as a radio broadcaster or an on-line streaming media provider. For example, the media guidance application may be implemented on a car audio system or other user device that outputs audio content via one or more speakers, and then receive one or more media assets for presentation to a group of users.

The media guidance application may, in response to both determining that the first user preference does correspond to presenting the media asset and that the second user preference does not correspond to presenting the media asset, generate an alert notifying the first user to access a second output device to access the media asset, wherein the second output device has a second output device type. The second output device may be a personal computer, mobile phone, multi-media console in a car with an input for headphones, or an mp3 player. For example, the media guidance application may determine that "Roar" by Katy Perry is a song of the "Pop" genre, but not of the "Big Band" genre. The media guidance application may then generate an alert, for example, a text message sent to a mobile device of the first user, notifying the first user that since the second user does not have a preference for "Roar," in order to listen to the song the first user has a preference for, he or she should plug in headphones to their mobile device which will output the song.

The media guidance application may, in response to both determining that the first user preference and the second user preference correspond to presenting the media asset, transmit the first media asset to the first output device. For example, the media guidance application may determine that both users have a preference for music of the "Pop" genre, which matches a characteristic of the song "Roar" (e.g., it is a song in the "Pop" genre). In response, the media guidance application may output the song on the first output device since both users expressed a preference for it.

In some embodiments, to determine whether to present the media asset to the first user based on the first user preference corresponding to a characteristic of the media asset, the media guidance application may compare the first user preference and the second user preference to a characteristic of the media asset. For example, the media guidance application may compare a characteristic of the song "Roar" by Katy Perry, such as the genre "Pop" to the first user preference for "Pop" songs and the second user preference for "Big Band" songs. The media guidance application may then determine that the first user preference corresponds to presenting the media asset and the second user preference corresponds to not presenting the media asset. For example, the media guidance application may determine that since the first user preference exactly matches the genre of "Roar,"

and that the second user preference does not match the genre or any other characteristic of "Roar," that "Roar" should be presented to the first user and not the second user.

Furthermore, in some embodiments, when determining to present the media asset to the first user based on whether the first user preference corresponds to the characteristic of the media asset, the media guidance application may receive metadata from a content source for the media asset. For example, the media guidance application may receive and extract metadata for an upcoming song on the station "FM93.1, Current Pop Hits." The media guidance application may compare the metadata for the media asset to the first user preference and the second user preference. For example, the media guidance application may extract the string, "Pop" from a genre parameter and compare it to the first user preference for "Pop" and the second user preference for "Big Band." The media guidance application may determine the metadata for the media asset matches the first user preference and does not match the second user preference. For example, based on a pre-defined rule set of associations between various terms, the media guidance application may determine that the first user preference for "Pop" matches the genre exactly of the song "Roar" but that the second user preference for "Big Band" does not match the genre for "Roar."

In some embodiments, the media guidance application may determine the position of the first and second user correspond to the same output device. For example, the media guidance application may receive a first location of the first user and a second location of the second user. For example, the media guidance application may receive an indication from a pressure sensor that the first user is sitting in the middle seat of a car, which may be assigned a value "4," based on the driver's position being "1" and moving clockwise around the car. For example, the media guidance application may receive an indication from a pressure sensor that the second user is sitting in the rear driver side seat of a car, which may be assigned a value "5," based on the driver's position being "1" and moving clockwise around the car. The media guidance application may access a database containing a plurality of output devices and positions corresponding to each of the plurality of output devices, where the database includes the first position of the first output device and the second position of the second output device. For example, the media guidance application may access a database organized as a table where each row contains a different output device and each column contains coordinates and/or indicators of position of each output device.

The media guidance application may retrieve a first value for the first position from a first field in the database. For example, the media guidance application may retrieve that "speaker 1" corresponding to the rear driver side door has value "5." The media guidance application may compare the first value to the first location of the first user and the first value to the second location of the second user. For example, the media guidance application may compare the retrieved value "5" to the first user location "4" for and the second user location "5." The media guidance application may determine that both the first user and the second user are within a threshold distance from the first output device. For example, the media guidance application may determine that the closest output device to locations "4" and "5" is the first output device and no other output devices are closer for either the first or second user.

In some other embodiments, the media guidance application may determine that the second user's position corresponds to the first output device, while the first user's position does not correspond to any output device. For example, the media guidance application may receive a first location of the first user and a second location of the second user. For example, the media guidance application may receive an indication from RFID readers in the middle rear seat of a car and the rear driver side seat that it has detected RFID chips corresponding to the first user and second user, respectively. The media guidance application may determine from the second location that the second user is within a threshold distance of the first output device. For example, based on comparison with a database of output devices, the media guidance application may determine that the second user is located within a three foot threshold distance from the rear driver side speaker. The media guidance application may determine from the first location that the first user is not within the threshold distance of the first output device and that the first user is not within the threshold distance of any output devices of the first device type. For example, based on comparison with a database of output devices, the media guidance application may determine that the first user is located more than a three foot threshold distance away from the rear driver side speaker and that no other speakers integrated into the car are closer to the user.

In some embodiments, the media guidance application generates for display an indication of an upcoming media asset. For example, the media guidance application may display on a screen in the dashboard of a car text that Roar, by Katy Perry" is starting soon. The media guidance application may receive a first indication of interest from the first user in the upcoming media asset as the first user preference. For example, the media guidance application may receive a user input using the touchscreen of a mobile device indicating that the first user is "highly interested" in the media asset. The media guidance application may receive a second indication of interest from the second user in the upcoming media asset as the second user preference. For example, the media guidance application may receive a user input using the touchscreen of a mobile device indicating that the first user is "not interested" in the media asset.

In some embodiments, the media guidance application may retrieve, from metadata associated with the media asset, a title of the media asset. For example, the media guidance application may extract from metadata associated with the media asset the string, "Roar" from a title parameter. The media guidance application may then generate for display on the alert the title of the media asset. For example, the media guidance application may generate for display the title "Roar" with the alert.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 8 shows an illustrative example of pseudocode for adjusting output of media assets based on user preferences, in accordance with some embodiments of the disclosure;

FIG. 10 shows an illustrative example of pseudocode for generating an alert to access a media asset on a different device type based on user preferences, in accordance with some embodiments of the disclosure.

DETAILED DESCRIPTION

Systems and methods are presented for a media guidance application that adjusts output parameters of media assets delivered to output devices based on user preferences of users near the output devices. For example, the media guidance application may adjust the volume to be higher at a speaker near a first user who enjoys a particular media asset and lower at a speaker near a second user who dislikes the media asset. As another example, the media guidance application may determine that a user enjoys a media asset, but is too far from an output device to view or listen to the media asset or that other users do not enjoy the media asset. In this instance, the media guidance application may alert the user to use a different output device type to view and/or listen to the media asset (e.g., on a mobile phone). By adjusting the output of devices near users based on their individual preferences, the present systems and methods can optimize each user's enjoyment of the same media asset in a shared listening and/or viewing experience.

As referred to herein, a "media guidance application," or an "interactive media guidance application" or, sometimes, a "media guidance application" or a "guidance application" is an application that allows a user to consume, and/or navigate to, media assets. In some embodiments, the media guidance application may be provided as an online application (i.e., provided on a website), or as a stand-alone application on a server, user device, etc. In some embodiments, the media guidance application may be executed on the first device and a second device simultaneously, or at a location remote from either device (e.g., a remote server), or any suitable combination. In some embodiments, control circuitry installed on various devices and platforms may execute the media guidance application, as described in more detail below. In some embodiments, the media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media card, register memory, processor caches, Random Access Memory ("RAM"), etc.

Figure 1:
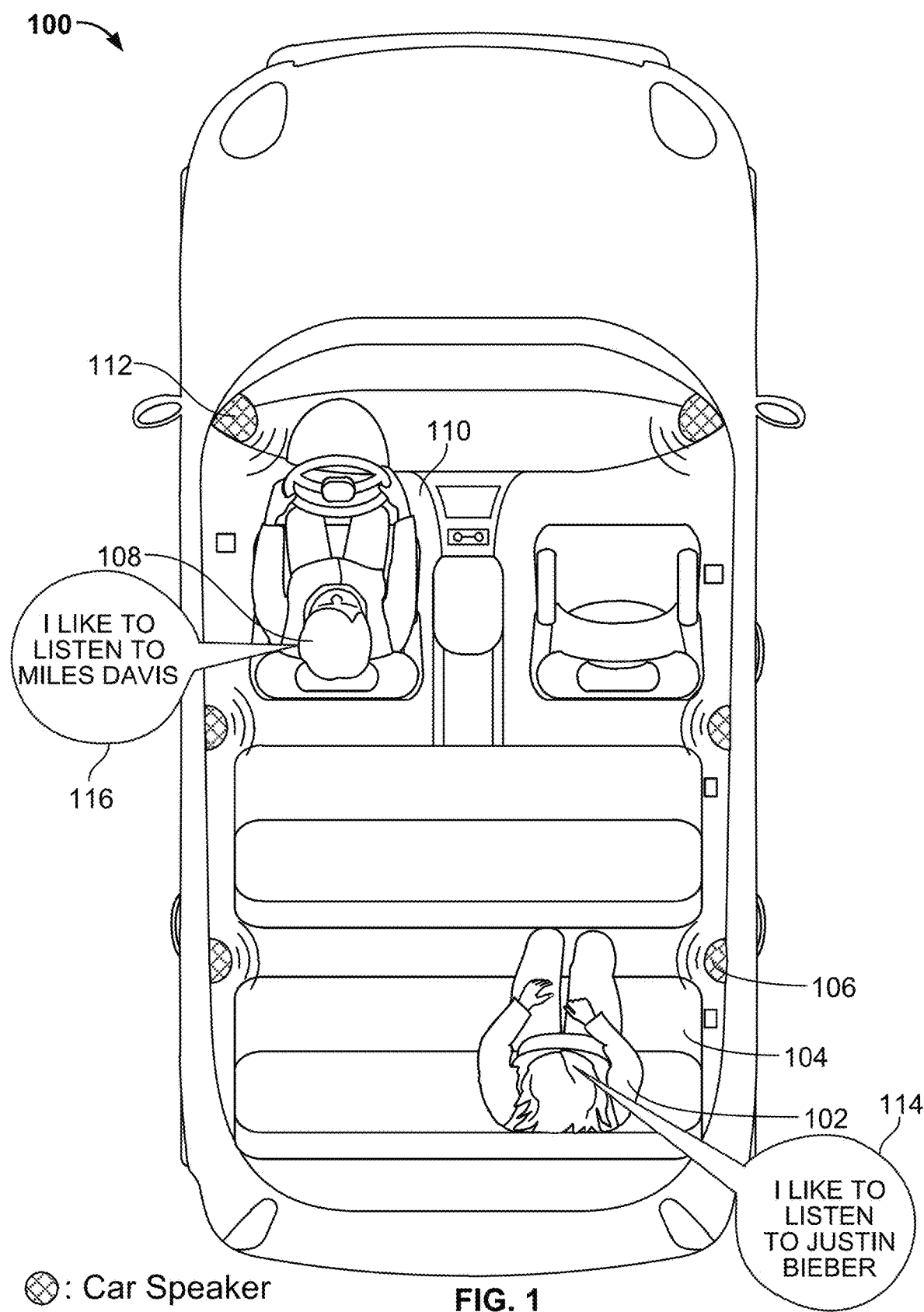
FIG. 1 shows an illustrative example of a media guidance application adjusting output of a media asset based on user preferences, in accordance with some embodiments of the disclosure.

FIG. 1 shows an illustrative example of a media guidance application adjusting output of a media asset based on user preferences, in accordance with some embodiments of the disclosure. For example, FIG. 1 shows car 100 with a plurality of output devices (e.g., speakers 106 and 112). The output devices are associated with positions (e.g., rear passenger side seat 104 and front driver side seat 110) that are occupied by users (e.g., users 102 and 108).

The media guidance application determines a first user is at a first position, where the first position corresponds to a first output device. For example, the media guidance application may receive an indication from a radio-frequency identification ("RFID") reader in the rear passenger side door of car 100 that it has detected an RFID chip corresponding to user 102. The media guidance application may then determine that since user 102 is seated in rear passenger side seat 104 of car 100, the position of user 102 corresponds to speaker 106 in the rear passenger side door.

As referred to herein, the term "position" should be understood to mean a condition encompassing a location or set of locations. As referred to herein, the term "location" is a specific place occupied by a user. In some embodiments, the position may be defined by a range of GPS values (e.g., encompassing GPS coordinates for specific locations a user may be located). Alternatively or additionally, a position may be defined by a reference to the locations in a specific area. For example, a room (e.g., a specific area) may be divided into locations where a user may be (e.g., the couch, recliner chair, etc.) each designated with a corresponding position (e.g., left wall, right wall, etc.) which may map to an output device (e.g., the left wall speaker, right wall speaker, etc.). In some other embodiments, the user may be located in a particular seat (e.g., a location) among a set of seats (e.g., a position). For example, the location may refer to a particular seat in a car, airplane, theater, or stadium, of which several seats are grouped as the same position (e.g., a section of a baseball stadium). In yet another embodiment, the position may account for a third dimension. For example, the position may be a particular section of a volume defining a space (e.g., the upper deck of a baseball stadium and the lower deck may be separate positions so that a user sitting directly above another user is not at the same position). Alternatively or additionally, a position may be defined by its proximity to one or more output devices within a location. For example, a room may include a plurality of output devices (e.g., speakers) which each have a corresponding position, where each position contains a range of locations that define the position (e.g., based on proximity to a particular speaker).

The media guidance application determines that a second user is at a second position that corresponds to a second output device. For example, the media guidance application may receive an indication that a device associated with user 108 is connected to a port located near the front driver side seat 110 of car 100. The media guidance application may then determine that since user 108 is seated in the front driver side seat 110, the position of user 108 corresponds to speaker 112 in the front driver side seat door.

The media guidance application receives a first user preference of the first user and a second user preference of a second user. For example, the media guidance application may receive first user preference 114 for music by the artist, "Justin Bieber," and second user preference 116 for music by the artist, "Miles Davis." Likewise, the media guidance application may receive, from a second user input by the second user, the second user preference. For example, the media guidance application may receive a user input from a touch screen on a mobile device that user 102 prefers "classic rock" songs. Likewise, the media guidance application may receive a user input from a keypad of a mobile device that second user 108 prefers "hip-hop" songs. Alternatively or additionally, the media guidance application may access a first user profile associated with the first user and a second user profile associated with the second user. For example, the media guidance application may access the profiles on a website based on a link to the website associated with each user stored in storage (e.g., storage as described in FIG. 5). The media guidance application may then retrieve the first user preference from the first user profile and the second user preference from the second user profile. For example, the media guidance application may retrieve the user preference of users 102 and 108 from posts on their respective user profiles.

The media guidance application receives a media asset. For example, the media guidance application may receive the song, "Sorry," by Justin Bieber from a content provider such as a radio broadcaster or an on-line streaming media provider. For example, the media guidance application may be implemented on a car audio system (e.g., in car 100) or other user device (e.g., any of the user equipment devices as described in FIGS. 5-6 below) that outputs audio content via one or more speakers (e.g., speakers 106 and 112), and receive one or more media assets for presentation to a group of users.

As referred to herein, the term "user preference" should be understood to mean any input to the media guidance application related to interests (or lack thereof) of the user in one or more media assets. In some embodiments, the user preference may be any data relating to the media asset. For example, the user preference may be a post on social media by the user relating to the title, artist, or lyrics of the media asset. Alternatively or additionally, the user preference may include favorable and unfavorable designations of data relating to the media asset. For example, the phrase "I love action movies" is a user preference for "action movies" while "I hate action movies" is not. In another embodiment, the user preference may be an implicit user preference based on a relationship between an explicit user preference and the media asset. For example, the user may input that the genre "rock" music is something they enjoy and the media guidance application may interpret this as an implicit user preference for "punk" music since the two are related. In yet another embodiment, the user preference may be related to past viewing and/or listening preferences. For example, if the user has listened to "rock" music for 40 straight days, the media guidance application may determine from a listening history of the user that "rock" is a user preference. In another embodiment, the user preference may be a combination of user preferences, which may include weightings of each preference. For example, a user may express a preference for "action movies" but dislikes the actor "Tom Cruise" more, such that the movie "Mission Impossible," which is an action movie with Tom Cruise, may not be preferred by the user.

The media guidance application then determines whether to present the media asset to the first user based on the first user preference corresponding to a characteristic of the media asset. For example, the media guidance application may determine that the received media asset, "Sorry," is a song by artist "Justin Bieber" (i.e., a characteristic of the media asset). The media guidance application may then determine based on character matching or other means of comparing two strings of text that the characteristic (e.g., "Justin Bieber") matches first user preference 114 (e.g., music by the artist "Justin Bieber"). Likewise, the media guidance application may determine whether the second user preference corresponds to the characteristic of the media asset. For example, the media guidance application may determine that the received media asset, "Sorry" is a song by artist "Justin Bieber" (i.e., a characteristic of the media asset). The media guidance application may then determine based on character matching or other means of comparing two strings of text that the characteristic (e.g., "Justin Bieber") does not match second user preference 116 (e.g., music by the artist "Miles Davis").

As referred to herein, the phrase "characteristic of the media asset" should be understood to mean any descriptive term relating to the media asset. In some embodiments, the characteristic of the media asset may be a descriptive term relating to the content of the media asset. For example, the characteristic may be the title, genre, artist, year, length, country of origin, content rating, a keyword, a lyric, and/or any other information about a media asset, which may be used to distinguish one media asset from another media asset. In another embodiment, the characteristic of the media asset may be a descriptive term relating to the file or signal containing the media asset. For example, the characteristic may be an encoding format (e.g., MPEG) or file size (e.g., less than 3 megabytes).

In some embodiments, to determine whether to present the media asset to the first user based on the first user preference corresponding to a characteristic of the media asset, the media guidance application may receive metadata from a content source for the media asset. For example, the media guidance application may receive metadata for an upcoming song on the station "FM93.1, Current Pop Hits." The media guidance application may then compare the metadata for the media asset to the first user preference. For example, the metadata may include characteristics of the upcoming song, such as the title and artist. The media guidance application may compare this to the user preference (e.g., user preference 114 and 116). The media guidance application may then determine whether the metadata for the media asset matches the first user preference. For example, the media guidance application may determine that since the artist of the song is not "Justin Bieber," the media asset does not match the first user preference.

Furthermore, in some embodiments, when determining to present the media asset to the first user (e.g., user 102) based on whether the first user preference (e.g., first user preference 114) corresponds to the characteristic of the media asset, the media guidance application may compare the characteristic of the media asset with the first user preference. For example, the media guidance application may compare a user preference for "rock" music to characteristics of the media asset, like the title and genre of the media asset. The media guidance application may, based on comparing the characteristic of the media asset with the first user preference, assign a first similarity value for the media asset and the first user preference. For example, the media guidance application may determine that the user preference for "rock" corresponds to a similarity rating of 9 out of 10 for the song, "Smoke on the Water." The media guidance application may compare the first similarity value to a threshold similarity value. For example, the media guidance application may compare the 9 out of 10 similarity to a threshold similarity for presenting the media asset, such as 7 out of 10. The media guidance application may, in response to determining the first similarity value exceeds the threshold similarity value, determine to present the media asset to the first user. For example, since 9 is greater than 7, the media guidance application may determine to present "Smoke on the Water" to the first user.

The media guidance application, in response to both determining to present the media asset to the first user and determining that the first user is at the first position, determines to adjust an output parameter for the media asset at the first output device. For example, upon determining that user 102 likes songs by Justin Bieber and "Sorry" is a song by Justin Bieber, and that user 102 is seated in rear passenger side seat 104, the media guidance application may increase the volume of rear passenger side speaker 106 to be louder so that the user can enjoy the song. Alternatively or additionally, the media guidance application, in response to both determining that the second user preference does not correspond to presenting the media asset and determining that the second user is at the second position, determines not to adjust the output parameter for the media asset at the second output device. For example, upon determining that user 108 does not have a preference for songs by Justin Bieber since "Miles Davis" is a different artist, and that user 108 is seated in front driver side seat 110, the media guidance application may determine not to increase the volume of the front driver side speaker 112, since user 108 has no preference for the song, "Sorry." Thus, by adjusting the output parameter of a media asset selected from the pooled user preferences of users (e.g., passengers in car 100) based on each individual user's preferences, the media guidance application enhances a user's enjoyment of media assets he or she likes, while minimizing a user's displeasure from media assets he or she dislikes.

As referred to herein, the phrase, "an output parameter" should be understood to mean any property or state of an output device that can be manipulated by the media guidance application. In some embodiments, the output parameter may be a property of the audio and/or video being output. For example, the output parameter may be a color, shape, brightness, resolution, volume, an equalizer setting (e.g., bass/treble balance), or version of the media asset (e.g., censored). In another embodiment, the output parameter may be the state of an output device. For example, the output parameter may be whether or not a output device is turned on. In yet another embodiment, the output parameter may be a combination of output parameters. For example, the output parameter may be volume of a speaker and brightness of a display screen.

The media guidance application may adjust numerous different output parameters. In some embodiments, the media guidance application may determine the output parameter is a volume increase of the media asset. For example, the media guidance application may maintain a stored list of output parameters for different output devices and their current values (e.g., in storage as described further in FIG. 5 below) and determine based on user preferences to adjust certain values, such as increasing the volume. The media guidance application may determine an amount of the volume increase based on the first user preference. For example, the media guidance application may determine that since user 102 expresses a particularly strong interest in the media asset, "Sorry," to increase the volume by 20 dB. The media guidance application may transmit to the first output device an indication of the amount of volume increase. For example, the media guidance application may transmit a data packet to a receiver or amplifier to increase the volume for speaker 106 near user 102 by 20 dB.

In some embodiments, the media guidance application may determine the output parameter is a version of the media asset. For example, the media guidance application may maintain a stored list of output parameters for different output devices and their current values (e.g., in storage as described further in FIG. 5 below) and determine based on user preferences to adjust certain values, such as whether media assets containing inappropriate content should be presented. The media guidance application may determine from the characteristic of the media asset that the media asset contains inappropriate content. For example, the media guidance application may determine a media asset contains a Boolean for inappropriate content assigned a value "true." The media guidance application may, based on the first user preference, request the alternate version of the media asset to transmit to the first output device. For example, if first user preference 114 is for censored media assets, the media guidance application may request a censored version of the media asset (e.g., from the content source) to output for user 102.

In addition to the techniques discussed above, the media guidance application may determine the position of a user in a number of ways. For example, the media guidance application may receive a location of the first user and use the location to determine the first position. For example, the media guidance application may receive an indication from a pressure sensor that user 102 is sitting in the rear passenger side seat of a car, which may be assigned an arbitrary position value "8." The media guidance application may access a database containing a plurality of output devices and positions corresponding to each of the plurality of output devices, where the database includes the first position of the first output device and the second position of the second output device. For example, the media guidance application may access the database which may be stored locally in memory (e.g., storage 508), or remotely at a media guidance data source (e.g., media guidance data source 618) accessible via a communications network (e.g., communications network 614), as described further in FIGS. 5-6 below. For example, the media guidance application may access a database organized as a table where each row contains a different output device (e.g., speaker 106 and 112) and each column contains coordinates and/or indicators of position of each output device.

In another example, the media guidance application may receive a packet containing information relating to the first user. For example, the media guidance application receive a data packet containing a string user_ID="John123," and a string location="backseat." The media guidance application may analyze the information contained in the packet to determine an identity of user 102 and the location of user 102. For example, the media guidance application may analyze the variables received in the data packet and determine that user 102 "Sean" is sitting in rear passenger side seat 104 of car 100.

The media guidance application may retrieve a first value for the first position from a first field in the database and a second value for the second position from a second field in the database. For example, the media guidance application may retrieve information that "speaker 1," which corresponds to rear passenger side door speaker 106, has a value of "5" and that "speaker 2," which corresponds to front driver side door speaker 112, has a value of "2." The media guidance application may compare the first value and the second value to the location of the first user. For example, the media guidance application may compare the retrieved values "2" and "5" to "4." The media guidance application may determine that the first value corresponds to a shorter distance to the location of the first user. For example, the media guidance application may determine based on a rule-set that user 102 is located closer to rear passenger side door speaker 106.

In some embodiments, the media guidance application generates for display an indication of an upcoming media asset. For example, the media guidance application may display on a screen in the dashboard of car 100 text that "Roar, by Katy Perry" is starting soon. The media guidance application may receive a first indication of interest from the first user in the upcoming media asset as the first user preference. For example, the media guidance application may receive a user selection of a "thumbs-up" icon on the screen of a mobile device indicating that user 102 is interested in the media asset. The media guidance application may receive a second indication of interest from the second user in the upcoming media asset as the second user preference. For example, the media guidance application may receive a user selection of a "thumbs-down" icon on the screen of a mobile device indicating that user 108 is not interested in the media asset.

Figure 2:
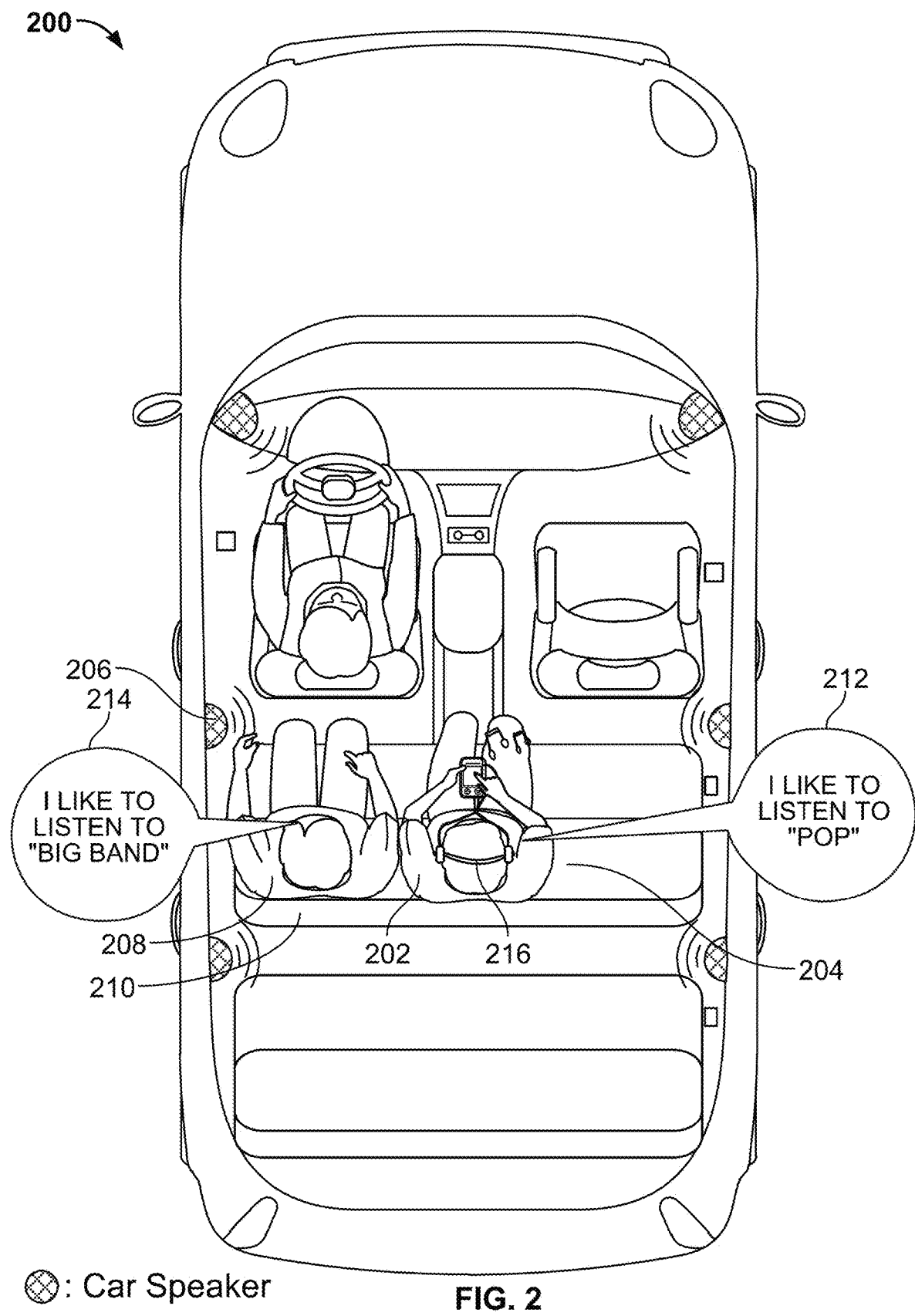
FIG. 2 shows an illustrative example of a media guidance application generating an alert to access a media asset on a different device type based on user preferences, in accordance with some embodiments of the disclosure.

FIG. 2 shows an illustrative example of a media guidance application generating an alert to access a media asset on a different device type based on user preferences, in accordance with some embodiments of the disclosure. For example, FIG. 2 shows car 200 with a plurality of output devices including some of different output device types (e.g., speaker 206 and mobile device 216). The output devices are associated with positions (e.g., middle seat 204 and middle driver side seat 210) that are occupied by users (e.g., users 202 and 208).

The media guidance application determines a first user and a second user are both associated with a first output device, where the first output device has a first output device type. The first output device type may be integrated speakers (e.g., speaker 206) or integrated display screens in a car, room, or other location. For example, the media guidance application may receive an indication from an RFID reader in the rear driver side door of car 200 that it has detected an RFID chip corresponding to user 202. The media guidance application may then determine that since user 202 is seated in middle seat 204 of car 200, the position of user 202 corresponds to speaker 206 in the rear driver side door. The media guidance application may also receive an indication that a device associated with user 208 is connected to a port located near the rear driver side door of car 200. The media guidance application may then determine that since user 208 is located near the rear driver side door, the position of user 208 corresponds to the same speaker (e.g., speaker 206) in the rear driver side door.

As referred to herein, the phrase "output device type" should be understood to mean a device that is differentiated from other devices by a general category. In some embodiments, the output device type may be a type of mobile devices. For example, the output device type may be a mobile phone, or a tablet. In other embodiments, the output device type may be a type of structurally fixed device. For example, the output device type may be a speaker integrated into a car door or stage. In some embodiments, one output device may be a personal listening device, while another is not. For example, one output device may be speakers that multiple people can hear; while another output device may be headphones connected to a mobile phone that only one user can hear (e.g., a personal listening device). Alternatively or additionally, some output devices may be both personal listening devices and public listening devices depending on a mode of operation. For example, a mobile phone with a speaker may be used to output a media asset to a group of users, or when operating with headphones to only one user. In some embodiments, the media guidance application may prevent output in one or more modes of an output device. For example, if a second user located near the first user does not have a preference for a particular media asset, the media guidance application may disable output of the media asset through speakers of a mobile phone of the first user and only allow listening through headphones.

The media guidance application receives a first user preference of the first user and a second user preference of a second user. For example, the media guidance application may receive first user preference 212 for music of the genre, "Pop," and second user preference 214 for music of the genre, "Big Band." Likewise, the media guidance application may receive, from a first user input by user 202, the first user preference. For example, the media guidance application may receive a user input from a touch screen on a mobile device that user 202 prefers "90s" songs. Similarly, the media guidance application may receive, from a second user input by user 208, the second user preference. For example, the media guidance application may receive a user input from a keypad of a mobile device that user 208 prefers "70s" songs. Alternatively or additionally, the media guidance application may access a first user profile associated with the first user and a second user profile associated with the second user. For example, the media guidance application may access the profiles on a website based on a link to the website associated with users 202 and 208 stored in storage (e.g., in storage as described further in FIG. 5 below). The media guidance application may then retrieve the first user preference from the first user profile and the second user preference from the second user profile. For example, the media guidance application may retrieve the user preference of users 202 and 208 from posts on their respective user profiles.

The media guidance application receives a media asset. For example, the media guidance application may receive the song, "Roar" by Katy Perry from a content provider such as a radio broadcaster or an on-line streaming media provider. For example, the media guidance application may be implemented on a car audio system or other user device that outputs audio content via one or more speakers (e.g., speaker 206), and receive one or more media assets for presentation to a group of users (e.g., users 202 and 208).

The media guidance application, in response to both determining that the first user preference does correspond to presenting the media asset and that the second user preference does not correspond to presenting the media asset, generates an alert notifying the first user to access a second output device to access the media asset, wherein the second output device has a second output device type. The second output device may be a personal computer, mobile phone, multi-media console in a car with an input for headphones, or an mp3 player. For example, the media guidance application may determine that "Roar" by Katy Perry is a song of the "Pop" genre, but not of the "Big Band" genre. Since the media guidance application determined that "Roar" corresponds to first user preference 212, but not to second user preference 214, the media guidance application may generate an alert. For example, the media guidance application may send a text message to a mobile device (e.g., mobile phone 216) of the first user, notifying the first user that since the second user does not have a preference for "Roar," in order to listen to the song the first user should plug in headphones to mobile device 216, which will output the song.

As referred to herein, the term "alert" refers to any way to notify a user of an upcoming or currently playing media asset. In some embodiments, the alert may be auditory. For example, the media guidance application may output through a speaker audio containing the alert. In other embodiments, the alert may be visual. For example, the alert may be a text message transmitted to a mobile device of the user. In yet another embodiment, the alert may contain both audio and visual elements to alert the user, such as the flash of an LED light near a user and audio stating the title of the upcoming song.

In some embodiments, to determine whether to present the media asset to the first user based on the first user preference corresponding to a characteristic of the media asset, the media guidance application may compare the first user preference and the second user preference to a characteristic of the media asset. For example, the media guidance application may compare a characteristic of the song "Roar" by Katy Perry, such as the genre "Pop" to first user preference 212 for "Pop" songs and second user preference 214 for "Big Band" songs. The media guidance application may then determine that the first user preference corresponds to presenting the media asset and the second user preference corresponds to not presenting the media asset. For example, the media guidance application may determine that since first user preference 212 exactly matches the genre of "Roar," and that second user preference 214 does not match the genre or any other characteristic of "Roar," that "Roar" should be presented to the first user (e.g., user 202) and not the second user (e.g., user 208).

Furthermore, in some embodiments, when determining to present the media asset to the first user based on whether the first user preference corresponds to the characteristic of the media asset, the media guidance application may receive metadata from a content source for the media asset. For example, the media guidance application may receive and extract metadata for an upcoming song on the station "FM93.1, Current Pop Hits." The media guidance application may compare the metadata for the media asset to the first user preference and the second user preference. For example, the media guidance application may extract the string, "Pop" from a genre parameter and compare it to first user preference 212 for "Pop" and second user preference 214 for "Big Band." The media guidance application may determine the metadata for the media asset matches the first user preference and does not match the second user preference. For example, based on a pre-defined rule set of associations between various terms, the media guidance application may determine that first user preference 212 for "Pop" matches the genre exactly of the song "Roar" but that second user preference 214 for "Big Band" does not match the genre for "Roar."

In some embodiments, the media guidance application may determine the position of the first and second user correspond to the same output device. For example, the media guidance application may receive a first location of the first user and a second location of the second user. For example, the media guidance application may receive an indication from a pressure sensor that user 202 is sitting in middle seat 204 of car 200, which may be assigned an arbitrary position value "4." Additionally, the media guidance application may receive an indication from a pressure sensor that user 208 is sitting in middle driver side seat 210 of car 200, which may be assigned an arbitrary value "5." The media guidance application may access a database containing a plurality of output devices and positions corresponding to each of the plurality of output devices, where the database includes the first position of the first output device and the second position of the second output device. For example, the media guidance application may access the database which may be stored locally in memory (e.g., storage 508), or remotely at a media guidance data source (e.g., media guidance data source 618) accessible via a communications network (e.g., communications network 614), as described further in FIGS. 5-6 below. For example, the media guidance application may access the database organized as a table where each row contains a different output device and each column contains coordinates and/or indicators of position of each output device.

The media guidance application may retrieve a first value for the first position from a first field in the database. For example, the media guidance application may retrieve that "speaker 1" corresponding to speaker 206 integrated into the middle driver side door has the arbitrary position value "5." The media guidance application may compare the first value to the first location of the first user and the first value to the second location of the second user. For example, the media guidance application may compare the retrieved value "5" to the location of user 202, "4" for and the location of user 208, "5." The media guidance application may determine that both the first user and the second user are within a threshold distance from the first output device. For example, the media guidance application may determine that the closest output device to locations "4" and "5" is the first output device (e.g., speaker 206) and no other output devices are closer to either user 202 or user 208.

In some other embodiments, the media guidance application may determine that the second user's position corresponds to the first output device, while the first user's position does not correspond to any output device. For example, the media guidance application may receive a first location of the first user and a second location of the second user. For example, the media guidance application may receive an indication from RFID readers in middle seat 204 of car 200 and middle driver side seat 210 that RFID chips have been detected corresponding to user 202 and user 208, respectively. The media guidance application may determine from the second location that the second user is within a threshold distance of the first output device. For example, based on comparison with a database of output devices and their respective positions, the media guidance application may determine that based on the location of user 208, user 208 is located within a three foot threshold distance from speaker 206. The media guidance application may determine from the first location that the first user is not within the threshold distance of the first output device and that the first user is not within the threshold distance of any output devices of the first device type. For example, based on comparison with the database of output devices and their respective positions, the media guidance application may determine that based on the location of user 202 and the position of each speaker, user 202 is located more than a three foot threshold distance away from speaker 206 and that no other speakers integrated into the car are closer to the user.

In some embodiments, the media guidance application generates for display an indication of an upcoming media asset. For example, the media guidance application may display on a screen in the dashboard of car 200 text that Roar, by Katy Perry" is starting soon. The media guidance application may receive a first indication of interest from the first user in the upcoming media asset as the first user preference. For example, the media guidance application may receive a user input using the touchscreen of a mobile device indicating that user 202 is "highly interested" in the media asset. The media guidance application may receive a second indication of interest from the second user in the upcoming media asset as the second user preference. For example, the media guidance application may receive a user input using the touchscreen of a mobile device indicating that user 208 is "not interested" in the media asset.

In some embodiments, the media guidance application may retrieve, from metadata associated with the media asset, a title of the media asset. For example, the media guidance application may extract from metadata associated with the media asset the string, "Roar" identified as a title parameter. The media guidance application may then generate for display on the alert the title of the media asset. For example, the media guidance application may generate for display the title "Roar" with the alert.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 3:
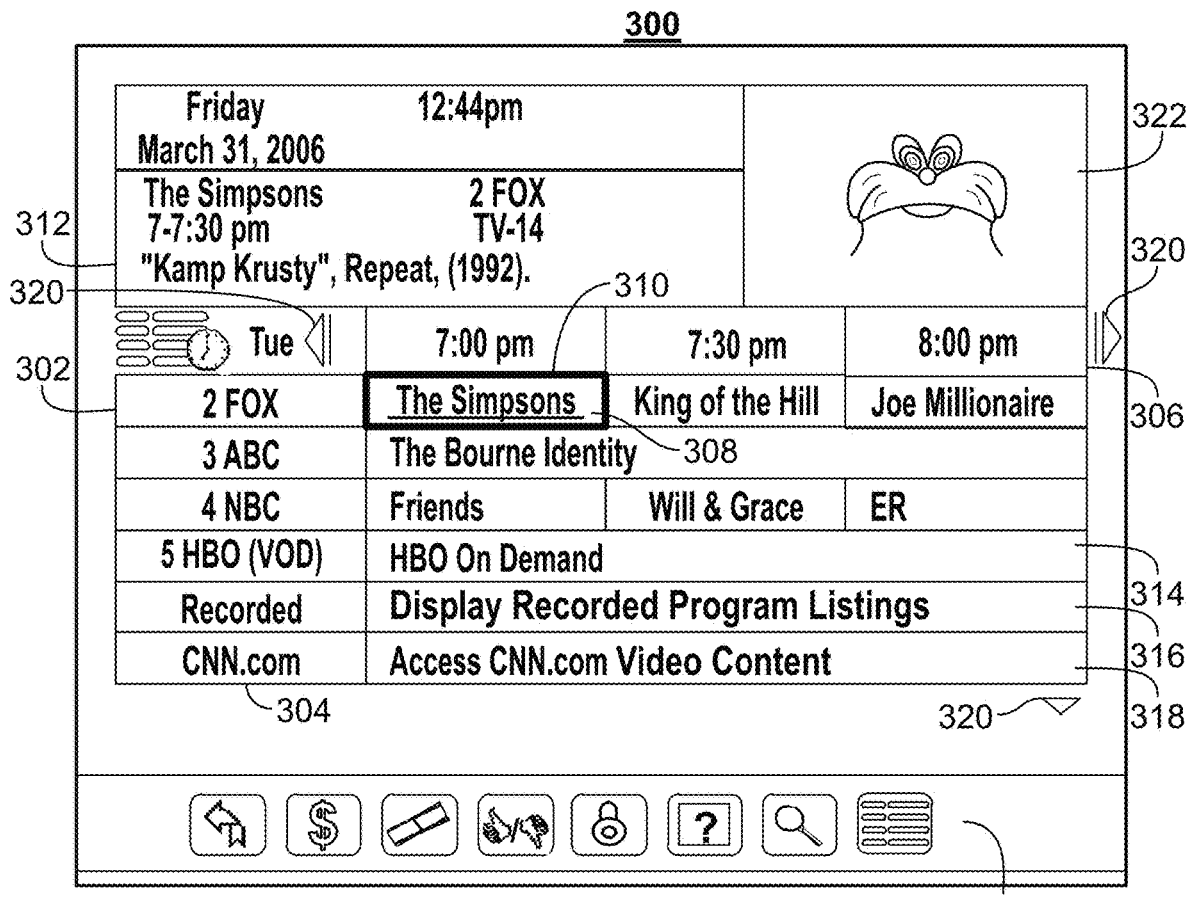
FIG. 3 shows an illustrative example of a display screen for use in accessing media content in accordance with some embodiments of the disclosure.
Figure 4:
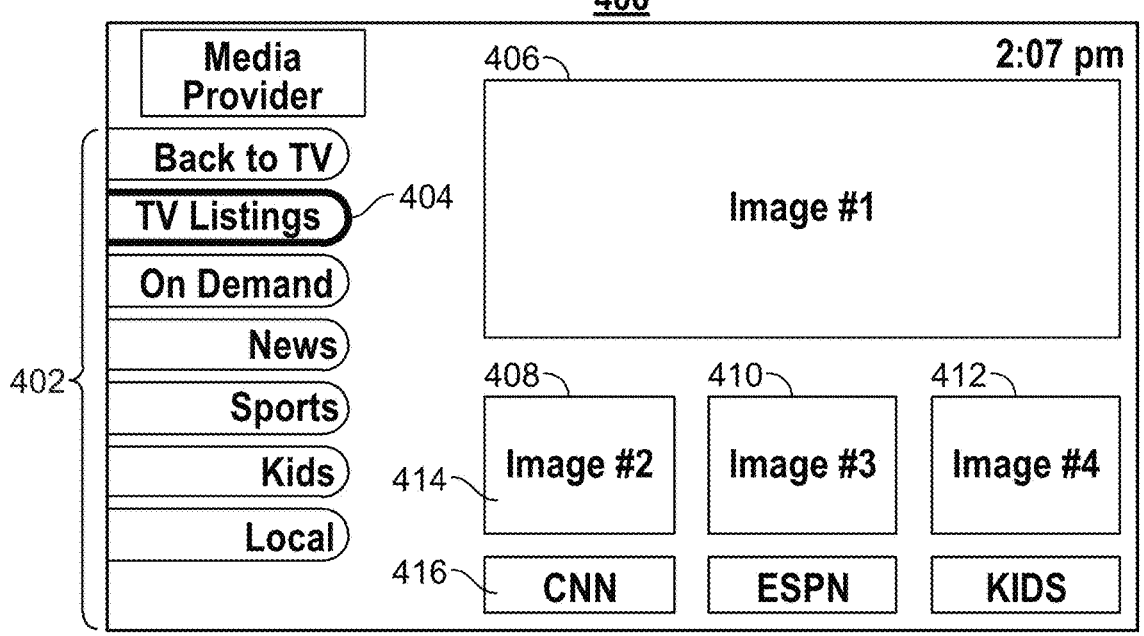
FIG. 4 shows another illustrative example of a display screen used access media content in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
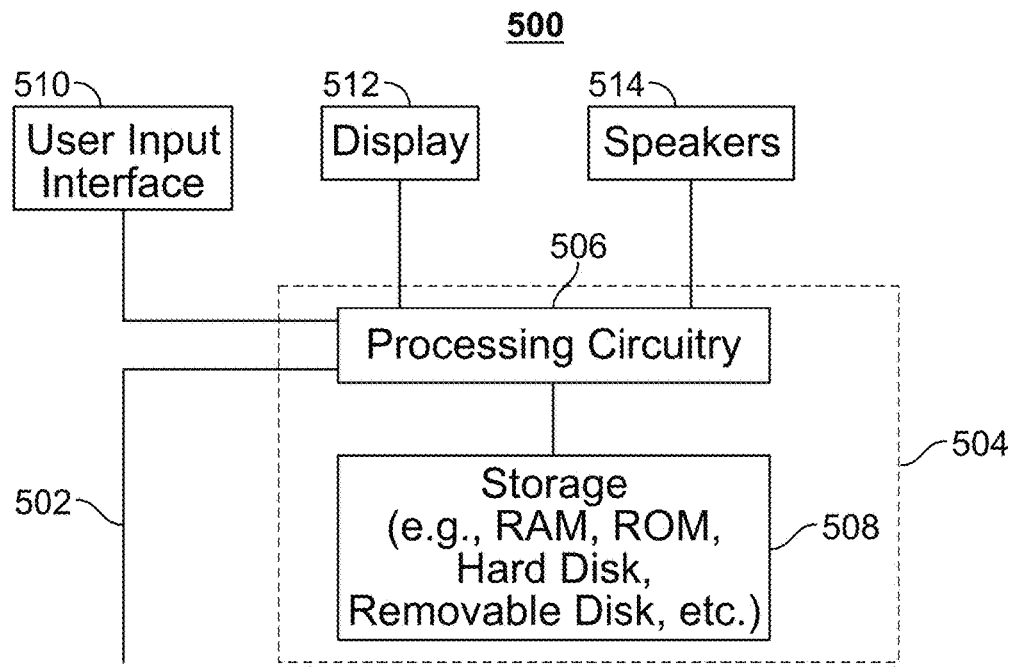
FIG. 5 is a block diagram of an illustrative user equipment device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
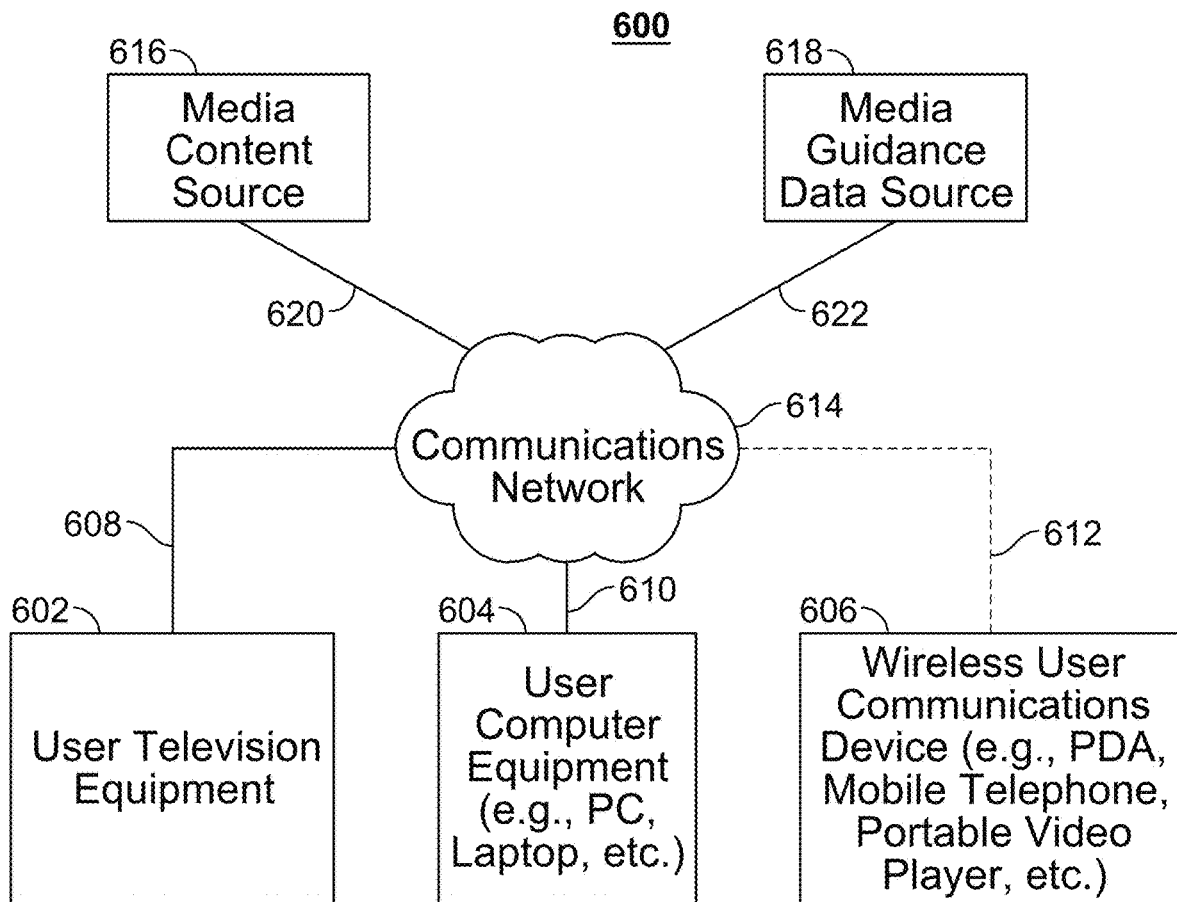
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 7:
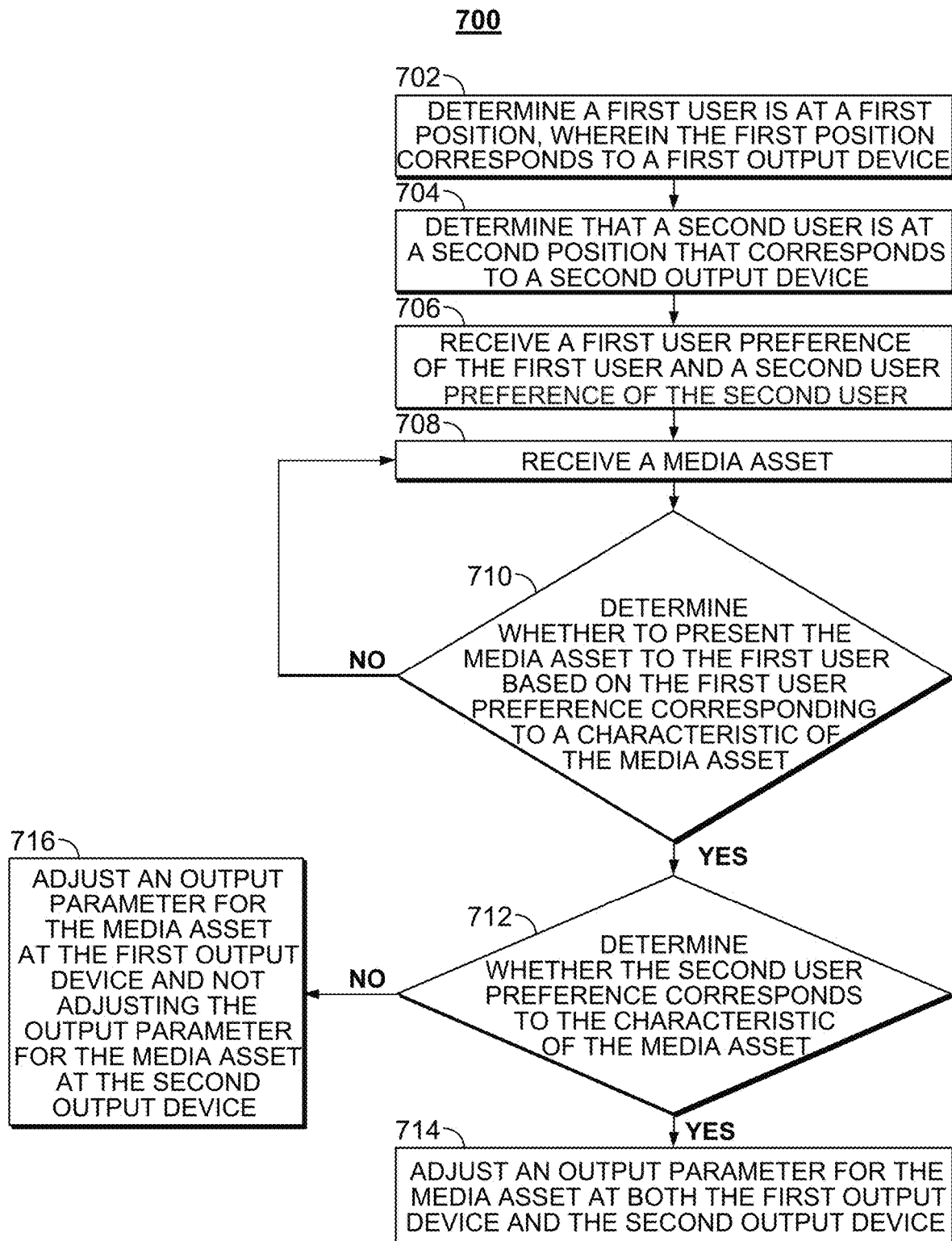
FIG. 7 is a flowchart of illustrative steps for adjusting output of media assets based on user preferences, in accordance with some embodiments of the disclosure.

FIG. 7 is a flowchart of illustrative steps for adjusting output of media assets based on user preferences, in accordance with some embodiments of the disclosure. For example, a media guidance application implementing process 700 may be executed by control circuitry 504 (FIG. 5). It should be noted that process 700 or any step thereof could be performed on, or provided by, any of the devices shown in FIGS. 5-6.

Process 700 begins at 702, where the media guidance application determines (e.g., via control circuitry 504 (FIG. 5)) a first user is at a first position, wherein the first position corresponds to a first output device. For example, the media guidance application may receive (e.g., via communications network 614 (FIG. 6)) an indication from an RFID reader that it has detected an RFID chip corresponding to the user. The media guidance application may extract (e.g., via control circuitry 504 (FIG. 5)) information from the indication regarding the position of the user, such as GPS coordinates or any other identifier which the media guidance application can then compare (e.g., via control circuitry 504 (FIG. 5)) to the positions of output devices. The media guidance application may determine (e.g., via control circuitry 504 (FIG. 5)) based on retrieving and comparing the positions of output devices from a database stored in memory (e.g., in storage 508 (FIG. 5)) that the first user (e.g., user 102) is closest to a first output device (e.g., speakers 106).

Process 700 continues to 704, where the media guidance application determines (e.g., via control circuitry 504 (FIG. 5)) that a second user is at a second position that corresponds to a second output device. Step 704 may proceed in the same manner as step 702 outlined above. For example, the media guidance application may determine (e.g., via control circuitry 504 (FIG. 5)) based on retrieving and comparing the positions of output devices from a database stored in memory (e.g., in storage 508) that the second user (e.g., user 108) is closest to a second output device (e.g., speakers 112).

Process 700 continues to 706, where the media guidance application receives (e.g., via communications network 614 (FIG. 6)) a first user preference of the first user and a second user preference of the second user. For example, the media guidance application may receive (e.g., via communications network 614 (FIG. 6)) a first user preference for music by the artist, "Justin Bieber," and a second user preference for music by the artist, "Miles Davis."

Process 700 continues to 708, where the media guidance application receives (e.g., via communications network 614 (FIG. 6)) a media asset. For example, the media guidance application (e.g., via communications network 614 (FIG. 6)) may receive the song, "Sorry," by Justin Bieber from a content provider (e.g., content source 616 (FIG. 6)) such as a radio broadcaster or an on-line streaming media provider. For example, the media guidance application may be implemented on a car audio system or other user device that outputs audio content via one or more speakers, and receive one or more media assets for presentation to a group of users.

Process 700 continues to 710, where the media guidance application determines (e.g., via control circuitry 504 (FIG. 5)) whether to present the media asset to the first user based on the first user preference corresponding to a characteristic of the media asset. For example, the media guidance application may determine (e.g., via control circuitry 504 (FIG. 5)) that the received media asset, "Sorry," is a song by artist "Justin Bieber" (i.e., a characteristic of the media asset). The media guidance application may then determine (e.g., via control circuitry 504 (FIG. 5)) based on character matching or other means of comparing two strings of text that the characteristic (e.g., "Justin Bieber") matches the user preference (e.g., music by the artist "Justin Bieber").

If the media guidance application determines to not present the media asset to the first user, process 700 returns to 708, where the media guidance application may receive (e.g., via communications network 614 (FIG. 6)) another media asset. For example, as described above in step 708, the media guidance application (e.g., via communications network 614 (FIG. 6)) may receive another song, "Roar," by Katy Perry from the same or a different content provider (e.g., content source 616 (FIG. 6)) such as a radio broadcaster or an on-line streaming media provider. In some embodiments, the media guidance application may continue to receive media assets from content sources (e.g., content source 616 (FIG. 6)) until a match to the first user preference is found. In other embodiments, the media guidance application may receive a media asset that corresponds to a user preference of the second user if process 700 returns to 708. In still other embodiments, the media guidance application may maintain a playback history stored in a database (e.g., in storage 508 (FIG. 5)) with a count of how many songs have matched preferences of a plurality of users and attempt a greater of number of times to present songs matching a user characteristic if that user characteristic has been matched fewer times than other user characteristics. The database may be reset after a listening session (e.g., after one continuous car trip) or be maintained for some period of time (e.g., two weeks). For example, if the media guidance application has received and presented 15 "Pop" songs and only 2 "Big Band" songs, the media guidance application may skip over some received "Pop" songs in an effort to present more "Big Band" songs to try to equalize the number of songs for each user's preference.

If the media guidance application determines to present the media asset to the first user, process 700 proceeds to 712, where the media guidance application determines (e.g., via control circuitry 504 (FIG. 5)) whether the second user preference corresponds to the characteristic of the media asset. For example, the media guidance application (e.g., via control circuitry 504 (FIG. 5)) may determine that the received media asset, "Sorry" is a song by artist "Justin Bieber" (i.e., a characteristic of the media asset). The media guidance application may then determine (e.g., via control circuitry 504 (FIG. 5)) based on character matching or other means of comparing two strings of text that the characteristic (e.g., "Justin Bieber") does not match the user preference (e.g., music by the artist "Miles Davis"). In embodiments where process 700 is executed for more than two users, step 712 occurs for each user after a characteristic of a media asset is found to match a user preference of one user.

If the media guidance application determines the second user preference does not correspond to the characteristic of the media asset, process 700 continues to 716, where the media guidance application adjusts (e.g., via control circuitry 504 (FIG. 5)) an output parameter for the media asset at the first output device and does not adjust the output parameter for the media asset at the second output device. For example, upon determining that the user likes songs by Justin Bieber and "Sorry" is a song by Justin Bieber, and that the user is seated in the rear driver side seat, the media guidance application may increase (e.g., via control circuitry 504 (FIG. 5)) the volume of the rear driver side speaker to be louder so that the user can enjoy the song. Continuing with the example, the media guidance application may, in response to both determining that the second user preference does not correspond to presenting the media asset and determining that the second user is at the second position, determine (e.g., via control circuitry 504 (FIG. 5)) not to adjust the output parameter for the media asset at the second output device. For example, upon determining (e.g., via control circuitry 504 (FIG. 5)) that the user does not have a preference for songs by Justin Bieber since "Miles Davis" is a different artist, and that the user is seated in the front passenger side seat, the media guidance application may determine (e.g., via control circuitry 504 (FIG. 5)) not to increase the volume of the front passenger seat speaker, since the user has no preference for the song, "Sorry." In embodiments with a greater number of users, the media guidance application may adjust the output at each output device based on the preferences of a user or users near each output device.

If the media guidance application determines the second user preference does correspond to the characteristic of the media asset, process 700 continues to 714, where the media guidance application adjusts (e.g., via control circuitry 504 (FIG. 5)) an output parameter for the media asset at the first output device and the second device. For example, upon determining (e.g., via control circuitry 504 (FIG. 5)) that the user likes songs by Justin Bieber and "Sorry" is a song by Justin Bieber, and that the user is seated in the rear driver side seat, the media guidance application may increase (e.g., via control circuitry 504 (FIG. 5)) the volume of both the rear driver side speaker and the front passenger side speaker so both the first and second users can enjoy the song.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. For example, multiple instances of process 700 may be executed for each of a plurality of users at a party or in a car to determine the location of each of the users and an output device they are each near. Furthermore, it should be noted that any of the devices or equipment discussed in relation to FIGS. 5-6 could be used to perform one or more of the steps in FIG. 7.

The pseudocode in FIG. 8 describes a process to adjust output of media assets based on user preferences. It will be evident to one skilled in the art that the process described by the pseudocode in FIG. 8 may be implemented in any number of programming languages and a variety of different hardware, and that the style and format should not be construed as limiting, but rather a general template of the steps and procedures that would be consistent with code used to implement some embodiments of this disclosure.

At line 801, control circuitry 504 initializes a subroutine to determine a first user is at a first position and that a second user is at a second position. For example, in some embodiments control circuitry 504 may copy instructions from non-transitory storage medium (e.g., storage device 508) into RAM or into the cache for processing circuitry 506 during the initialization stage. For example, a separate routine may determine the locations of the first and second users (e.g., as in FIG. 11 below) and then pass the results as parameters to the pseudocode (e.g., as inputs to a method).

At line 803, control circuitry 504 executes a routine to determine that the first position corresponds to a first output device and the second position corresponds to a second output device. For example, control circuitry 504 may access a database which may be stored locally in memory (e.g., storage 508), or remotely at a media guidance data source (e.g., media guidance data source 618) accessible via a communications network (e.g., communications network 614), as described further in FIGS. 5-6 above. For example, control circuitry 504 may access a database organized as a table where each row contains a different output device (e.g., speaker 106 and 112) and each column contains coordinates and/or indicators of position of each output device. Control circuitry 504 may, as part of the routine, execute a database query language script, such as SQL, to retrieve data from particular expressions in the table such that control circuitry 504 can compare the retrieved output coordinates for an output device to the user's location, as described above in FIG. 7.

At line 805, control circuitry 504 receives a first user preference of the first user and a second user preference of a second user. In some embodiments, the preferences may be retrieved from memory. Control circuitry 504 may receive these amounts by receiving, for example, a pointer to an array of strings in a user profile containing "Favorite artists" of the user. In some other embodiments, control circuitry 504 may receive, via user input using user input interface 510, the user preference directly from the user. For example, control circuitry 504 may receive a user input of the string "Bon Jovi" using a keypad on a mobile device.

At line 807, control circuitry 504 receives a media asset. For example, control circuitry 504 may receive a pointer to a location in an index data structure containing links to media assets that are currently available from different content sources. As another example, control circuitry 504 may receive a media asset stream from a content source (e.g., an MPEG stream), which may contain an event information table or other identifying data embedded with media asset.

At line 809, control circuitry 504 executes a routine to determine whether to present the media asset to the first user based on the first user preference corresponding to a characteristic of the media asset. For example, control circuitry 504 may extract a characteristic of a received media asset, from metadata embedded in a media asset stream from a content source or from a table or other data structure stored either locally in memory (e.g., storage 508), or remotely at a media guidance data source (e.g., media guidance data source 618) accessible via a communications network (e.g., communications network 614). Control circuitry 504 may then compare the characteristic of the media asset to the received first user preferences, as described above in detail in FIG. 7.

At line 811, control circuitry 504 executes a routine to determine whether the second user preference corresponds to the characteristic of the media asset. In some embodiments, control circuitry 504 may perform the same routine as described above in line 809 for each user determined to be in a certain area (e.g., by recursively calling the routine described in line 809 until each user's preference has been compared to the characteristic of the media asset). In other embodiments, control circuitry 504 may execute a second distinct routine to compare the characteristic of the media asset to the received second user preferences, as described above in detail in FIG. 7.

At line 813, control circuitry 504 iterates through the various received media assets, if only a single media asset has been received, the loop will only execute once. This loop may be implemented in multiple fashions depending on the choice of hardware and software language used to implement the algorithm of FIG. 8; for example, this may be implemented as part of a "for" or "while" loop.

At line 814, control circuitry 504 stores whether the first user preference corresponds to the characteristic of the media asset as a Boolean variable "A." In some embodiments, the variable will be stored as part of a larger data structure or class, and the value of Boolean variable A may be obtained through appropriate accessor methods. In some embodiments, control circuitry 504 may call a function to perform a comparison of the similarity of the user preference and the characteristic of the media asset, which may be an output of the routines described in lines 811 and 813 above, to a threshold value stored in memory (e.g., storage 508). For example, based on whether the similarity of the first user preference and the characteristic of the media asset meet the threshold value, control circuitry 504 assigns either a "true" or "false" value to Boolean variable A.

At line 815, control circuitry 504 stores whether the second user preference corresponds to the characteristic of the media asset as a Boolean variable "B." In some embodiments, the variable will be stored as part of a larger data structure or class, and the value of Boolean variable B may be obtained through appropriate accessor methods. In some embodiments, control circuitry 504 may call a function to perform a comparison of the similarity of the user preference and the characteristic of the media asset, which may be an output of the routines described in lines 811 and 813 above, to a threshold value stored in memory (e.g., storage 508). For example, based on whether the similarity of the second user preference and the characteristic of the media asset meet the threshold value, control circuitry 504 assigns either a "true" or "false" value to Boolean variable B.

At line 816, control circuitry 504 determines whether the logical statement is true (e.g., that the first user preference corresponds to the characteristic of the media asset). If the statement is true, then at line 817 control circuitry 504 executes a subroutine to adjust an output parameter for the first output device. For example, control circuitry 504 may adjust any of a variety of output parameters including, but not limited to increasing or decreasing the volume, equalizer settings, and whether a censored stream is played on a particular output device. Control circuitry 504 may retrieve the current state (e.g., the current output parameters) of an output device from a data structure (e.g., a table) stored in memory (e.g., storage 508). Control circuitry 504 may then update the value for a particular field in the data structure corresponding to an output parameter based on the user preference corresponding to the characteristic of the media asset. Control circuitry 504 may then synchronize the updated data structure with the output device, such that the output of the output device is updated. In some embodiments, an amount to update the value is determined by control circuitry 504 based on the similarity between the characteristic and the user preference.

At line 818, control circuitry 504 determines whether the logical statement is true (e.g., that the second user preference corresponds to the characteristic of the media asset). If the statement is true, then at line 819 control circuitry 504 executes a subroutine to adjust an output parameter for the second output device, which may be identical to the subroutine described in line 817 above, but instead of for the first output device for the second output device. If the logical statement is not determined to be true by control circuitry 504, control circuitry 504 does not adjust the output parameter of the second output device.

At line 821, control circuitry 504 runs a termination subroutine after the algorithm has performed its function. For example, in some embodiments control circuitry 504 may destruct variables, perform garbage collection, free memory or clear the cache of processing circuitry 506.

It will be evident to one skilled in the art that process 800 described by the pseudocode in FIG. 8 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs.

Figure 9:
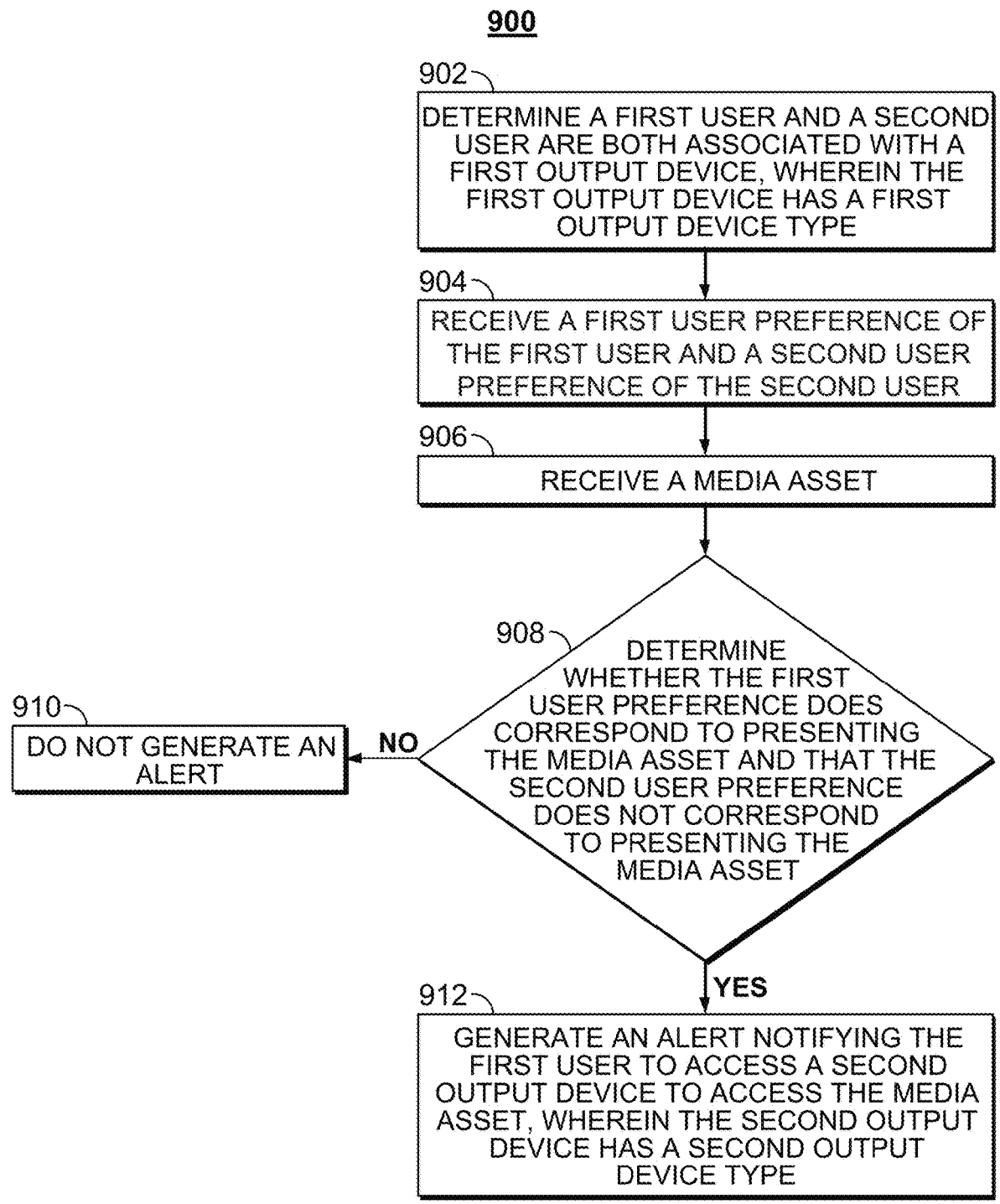
FIG. 9 is a flowchart of illustrative steps for generating an alert to access a media asset on a different device type based on user preferences, in accordance with some embodiments of the disclosure.

FIG. 9 is a flowchart of illustrative steps for generating an alert to access a media asset on a different device type based on user preferences, in accordance with some embodiments of the disclosure. For example, a media guidance application implementing process 900 may be executed by control circuitry 504 (FIG. 5). It should be noted that process 900 or any step thereof could be performed on, or provided by, any of the devices shown in FIGS. 5-6.

Process 900 begins with 902, where the media guidance application determines (e.g., via control circuitry 504 (FIG. 5)) a first user and a second user are both associated with a first output device, wherein the first output device has a first output device type. For example, the media guidance application may receive (e.g., via communications network 614 (FIG. 6)) an indication from an RFID reader in the rear driver side door of a car that it has detected an RFID chip corresponding to the first user. The media guidance application may then determine (e.g., via control circuitry 504 (FIG. 5)) that since the user is seated in the rear driver side seat of the car, the user's position corresponds to a speaker in the rear driver side door. The media guidance application may also receive an indication (e.g., via communications network 614 (FIG. 6)) that a device associated with the second user is connected to a port located near the rear driver side door of a car. The media guidance application may then determine (e.g., via control circuitry 504 (FIG. 5)) that since the second user is located near the rear driver side door, the second user's position corresponds to the same speaker in the rear driver side door.

Process 900 continues to 904, where the media guidance application receives (e.g., via communications network 614 (FIG. 6)) a first user preference of the first user and a second user preference of the second user. For example, the media guidance application may receive (e.g., via communications network 614 (FIG. 6)) a first user preference for music by the artist, "Justin Bieber," and a second user preference for music by the artist, "Miles Davis."

Process 900 continues to 906, where the media guidance application receives (e.g., via communications network 614 (FIG. 6)) a media asset. For example, the media guidance application (e.g., via communications network 614 (FIG. 6)) may receive the song, "Sorry," by Justin Bieber from a content provider (e.g., content source 616 (FIG. 6)) such as a radio broadcaster or an on-line streaming media provider. For example, the media guidance application may be implemented on a car audio system or other user device that outputs audio content via one or more speakers, and receive one or more media assets for presentation to a group of users.

Process 900 continues to 908, where the media guidance application determines (e.g., via control circuitry 504 (FIG. 5)) whether the first user preference does correspond to presenting the media asset and that the second user preference does not correspond to presenting the media asset. For example, the media guidance application may determine (e.g., via control circuitry 504 (FIG. 5)) that the received media asset, "Sorry," is a song by artist "Justin Bieber" (i.e., a characteristic of the media asset). The media guidance application may then determine (e.g., via control circuitry 504 (FIG. 5)) based on character matching or other means of comparing two strings of text that the characteristic (e.g., "Justin Bieber") matches none, one, or both user preferences (e.g., music by the artist "Justin Bieber").

If the media guidance application does not determine the first user preference does correspond to presenting the media asset and that the second user preference does not correspond to presenting the media asset, process 900 continues to 910, where the media guidance application does not generate an alert. For example, the media guidance application may determine (e.g., via control circuitry 504 (FIG. 5)) that neither the first user preference nor the second user preference corresponds to a characteristic of the received media asset, "Sorry." In this case, the media guidance application would not generate the alert, since neither user has expressed a preference for the media asset; in this instance, the media asset may not be presented. As another example, the media guidance application may determine (e.g., via control circuitry 504 (FIG. 5)) that both the first user preference and the second user preference corresponds to a characteristic of the received media asset, "Sorry." In this case, the media guidance application would not generate the alert, since both users have expressed a preference for the media asset; in this case, the output of the media asset may be adjusted by the media guidance application as described above in FIGS. 1 and 7-8 since both users enjoy the media asset.

If the media guidance application determines the first user preference does correspond to presenting the media asset and that the second user preference does not correspond to presenting the media asset, process 900 continues to 912, where the media guidance application generates (e.g., via control circuitry 504 (FIG. 5)) an alert notifying the first user to access a second output device to access the media asset, wherein the second output device has a second output device type. For example, the media guidance application may determine (e.g., via control circuitry 504 (FIG. 5)) that "Roar" by Katy Perry is a song of the "Pop" genre, but not of the "Big Band" genre. The media guidance application may then generate (e.g., via control circuitry 504 (FIG. 5)) an alert, for example, a text message sent to a mobile device of the first user, notifying the first user that since the second user does not have a preference for "Roar," in order to listen to the song, the first user should plug in headphones to their mobile device which will output the song.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. For example, multiple instances of process 900 may be executed for each of a plurality of users at a party or in a car to determine whether each user has expressed a preference for a media asset and is either not near an output device or other users near the same output device do not have a preference for the media asset. Furthermore, it should be noted that any of the devices or equipment discussed in relation to FIGS. 5-6 could be used to perform one or more of the steps in FIG. 9.

The pseudocode in FIG. 10 describes a process to generate an alert to access a media asset on a different device type based on user preferences. It will be evident to one skilled in the art that the process described by the pseudocode in FIG. 10 may be implemented in any number of programming languages and a variety of different hardware, and that the style and format should not be construed as limiting, but rather a general template of the steps and procedures that would be consistent with code used to implement some embodiments of this disclosure.

At line 1001, control circuitry 504 initializes a subroutine to determine a first user and a second user are both associated with a first out device of a first output device type. For example, in some embodiments control circuitry 504 may copy instructions from non-transitory storage medium (e.g., storage device 508) into RAM or into the cache for processing circuitry 506 during the initialization stage. For example, a separate routine may determine the locations of the first and second users (e.g., as in FIG. 11 below) and then pass the results as parameters to the pseudocode (e.g., as inputs to a method). For example, control circuitry 504 may execute a routine to determine that the first position corresponds to a first output device and the second position also corresponds to the first output device. For example, control circuitry 504 may access a database which may be stored locally in memory (e.g., storage 508), or remotely at a media guidance data source (e.g., media guidance data source 618) accessible via a communications network (e.g., communications network 614), as described further in FIGS. 5-6 above. For example, control circuitry 504 may access a database organized as a table where each row contains a different output device (e.g., speaker 106 and 112) and each column contains coordinates and/or indicators of position of each output device. Control circuitry 504 may, as part of the routine, execute a database query language script, such as SQL, to retrieve data from particular expressions in the table such that control circuitry 504 can compare the retrieved output coordinates for an output device to the user's location, as described above in FIG. 9.

At line 1003, control circuitry 504 receives a first user preference of the first user and a second user preference of a second user. In some embodiments, the preferences may be retrieved from memory. Control circuitry 504 may receive these amounts by receiving, for example, a pointer to an array of strings in a user profile containing "Favorite artists" of the user. In some other embodiments, control circuitry 504 may receive, via user input using user input interface 510, the user preference directly from the user. For example, control circuitry 504 may receive a user input of the string "Katy Perry" using a touchscreen on a mobile device.

At line 1005, control circuitry 504 receives a media asset. For example, control circuitry 504 may receive a pointer to a location in an index data structure containing links to media assets that are currently available from different content sources. As another example, control circuitry 504 may receive a media asset stream from a content source (e.g., an MPEG stream), which may contain an event information table or other identifying data embedded with media asset.

At line 1007, control circuitry 504 executes a routine to determine whether to present the media asset to the first user based on the first user preference corresponding to a characteristic of the media asset. For example, control circuitry 504 may extract a characteristic of a received media asset, from metadata embedded in a media asset stream from a content source or from a table or other data structure stored either locally in memory (e.g., storage 508), or remotely at a media guidance data source (e.g., media guidance data source 618) accessible via a communications network (e.g., communications network 614). Control circuitry 504 may then compare the characteristic of the media asset to the received first user preferences, as described above in detail in FIG. 9.

At line 1009, control circuitry 504 executes a routine to determine whether the second user preference corresponds to the characteristic of the media asset. In some embodiments, control circuitry 504 may perform the same routine as described above in line 1007 for each user determined to be in a certain area (e.g., by recursively calling the routine described in line 1007 until each user's preference has been compared to the characteristic of the media asset). In other embodiments, control circuitry 504 may execute a second distinct routine to compare the characteristic of the media asset to the received second user preferences, as described above in detail in FIG. 9.

At line 1011, control circuitry 504 iterates through the various received media assets, if only a single media asset has been received, the loop will only execute once. This loop may be implemented in multiple fashions depending on the choice of hardware and software language used to implement the algorithm of FIG. 8; for example, this may be implemented as part of a "for" or "while" loop.

At line 1012, control circuitry 504 stores whether the first user preference corresponds to the characteristic of the media asset as a Boolean variable "A." In some embodiments, the variable will be stored as part of a larger data structure or class, and the value of Boolean variable A may be obtained through appropriate accessor methods. In some embodiments, control circuitry 504 may call a function to perform a comparison of the similarity of the user preference and the characteristic of the media asset, which may be an output of the routines described in lines 1007 and 1009 above, to a threshold value stored in memory (e.g., storage 508). For example, based on whether the similarity of the first user preference and the characteristic of the media asset meet the threshold value, control circuitry 504 assigns either a "true" or "false" value to Boolean variable A.

At line 1013, control circuitry 504 stores whether the second user preference corresponds to the characteristic of the media asset as a Boolean variable "B." In some embodiments, the variable will be stored as part of a larger data structure or class, and the value of Boolean variable B may be obtained through appropriate accessor methods. In some embodiments, control circuitry 504 may call a function to perform a comparison of the similarity of the user preference and the characteristic of the media asset, which may be an output of the routines described in lines 1007 and 1009 above, to a threshold value stored in memory (e.g., storage 508). For example, based on whether the similarity of the second user preference and the characteristic of the media asset meet the threshold value, control circuitry 504 assigns either a "true" or "false" value to Boolean variable B.

At line 1014, control circuitry 504 determines whether the logical statement is true (e.g., that the first user preference corresponds to the characteristic of the media asset and that the second user preference does not correspond to the characteristic of the media asset). If the statement is true, then at line 1015 control circuitry 504 executes a subroutine to generate an alert notifying the first user to access a second output device to access the media asset. The second output device may have a second output device type, such as the second output device being an "mp3 player" and not "integrated speakers." For example, control circuitry 504 may access the database described above for line 1001, which may be stored locally in memory (e.g., storage 508), or remotely at a media guidance data source (e.g., media guidance data source 618) accessible via a communications network (e.g., communications network 614), as described further in FIGS. 5-6 above. For example, control circuitry 504 may access the database organized as a table where each row contains a different output device (e.g., speaker 106 and 112), as well as different columns for the output device type and user it is associated with, if applicable. In this way, control circuitry 504 can retrieve (e.g., by executing a database query language script such as SQL) an output device associated with the user to transmit the alert and media asset to, such that they can enjoy the media asset and the second user does not need to listen and/or view a media asset they do not enjoy.

At line 1016, control circuitry 504 determines whether the logical statement is true (e.g., that both the first and the second user preferences correspond to the characteristic of the media asset). If the statement is true, then at line 1017, control circuitry 504 executes a subroutine to adjust an output parameter for the first output device, which may be identical to that described above in FIGS. 7-8.

At line 1019, control circuitry 504 runs a termination subroutine after the algorithm has performed its function. For example, in some embodiments control circuitry 504 may destruct variables, perform garbage collection, free memory or clear the cache of processing circuitry 506.

It will be evident to one skilled in the art that process 1000 described by the pseudocode in FIG. 10 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs.

Figure 11:
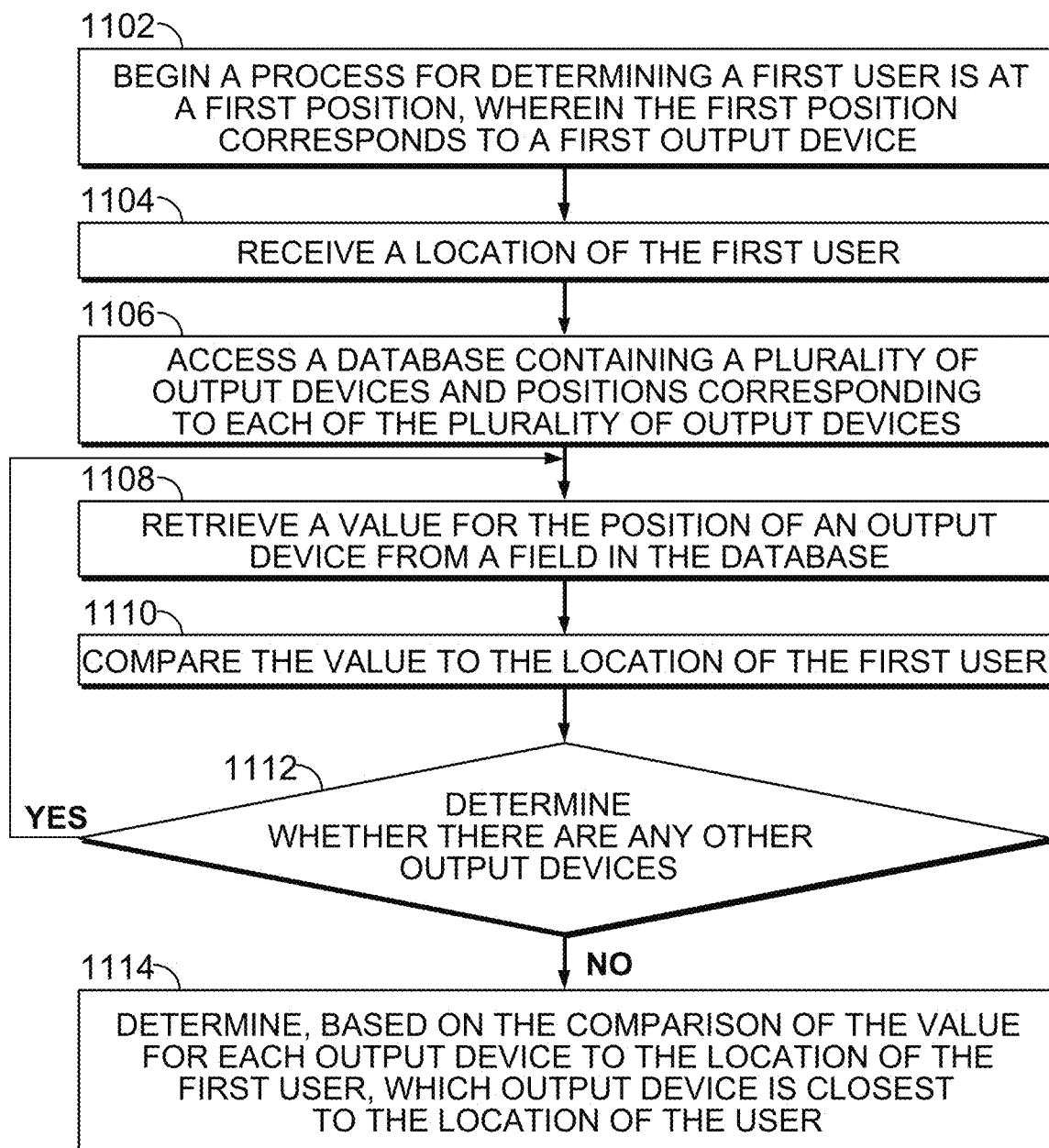
FIG. 11 is a flowchart of illustrative steps for determining the location of a user and an output device near the user, in accordance with some embodiments of the disclosure.

FIG. 11 is a flowchart of illustrative steps for determining the location of a user and an output device near the user, in accordance with some embodiments of the disclosure. For example, a media guidance application implementing process 1100 may be executed by control circuitry 504 (FIG. 5). It should be noted that process 1100 or any step thereof could be performed on, or provided by, any of the devices shown in FIGS. 5-6. Process 1100 begins with 1102, where the media guidance application begins a process (e.g., via control circuitry 504 (FIG. 5)) for determining a first user is at a first position, wherein the first position corresponds to a first output device. For example, the media guidance application may receive (e.g., via communications network 614 (FIG. 6)) an indication from an RFID reader in the rear driver side door of a car that it has detected an RFID chip corresponding to a particular user. The media guidance application may then determine (e.g., via control circuitry 504 (FIG. 5)) that since the user is seated in the rear driver side seat of the car, the user's position corresponds to a speaker in the rear driver side door.

Process 1100 continues to 1104, where the media guidance application receives (e.g., via communications network 614 (FIG. 6)) a location of the first user. For example, the media guidance application may receive (e.g., via communications network 614 (FIG. 6)) an indication from a pressure sensor that a user is sitting in the rear middle seat of a car, which may be assigned an arbitrary value "4." Alternatively, the location could be defined by GPS coordinates or any other coordinate space (e.g., the location of seats in a car is mapped on a two-dimensional plane where the origin is the driver's seat).

Process 1100 continues to 1106, where the media guidance application accesses (e.g., via control circuitry 504 (FIG. 5)) a database containing a plurality of output devices and positions corresponding to each of the plurality of output devices. For example, the media guidance application may access (e.g., via control circuitry 504 (FIG. 5)) the database which may be stored locally in memory (e.g., storage 508 (FIG. 5)), or remotely at a media guidance data source (e.g., media guidance data source 618 (FIG. 6)) accessible via a communications network (e.g., communications network 614 (FIG. 6)). For example, the media guidance application may access (e.g., via control circuitry 504 (FIG. 5)) a database organized as a table where each row contains a different output device (e.g., speaker 106 and 112) and each column contains coordinates and/or indicators of position of each output device.

Process 1100 continues to 1108, where the media guidance application retrieves (e.g., via control circuitry 504 (FIG. 5)) a value for the position of an output device from a field in the database. For example, the media guidance application may execute a database query language script, such as SQL, to retrieve (e.g., via control circuitry 504 (FIG. 5)) data from a particular expression in the table. For example, the media guidance application may retrieve (e.g., via control circuitry 504 (FIG. 5)) that "speaker 1," which corresponds to rear passenger side door speaker 106, has an arbitrary position value of, "5," based on each seat being associated with a particular number. Alternatively, the position could be defined by GPS coordinates or any other coordinate space (e.g., the location of seats in a car may be mapped on a two-dimensional plane where the origin is the driver's seat).

Process 1100 continues to 1110, where the media guidance application compares (e.g., via control circuitry 504 (FIG. 5)) the value to the location of the first user. For example, the media guidance application may, based on a pre-defined rule-set where particular locations of users (e.g., the driver's seat has a location value of "1") are matched to particular output devices (e.g., a speaker in the door of the driver's seat has a value of "2") determine the proximity (e.g., via control circuitry 504 (FIG. 5)) of a particular output device to the first user based on a series of logical statements. In other embodiments, the media guidance application may determine (e.g., via control circuitry 504 (FIG. 5)) based on subtracting coordinates of an output device from the user's location a distance from the device to the user.

Process 1100 continues to 1112, where the media guidance application determines (e.g., via control circuitry 504 (FIG. 5)) whether there are any other output devices. For example, the media guidance application may store (e.g., in storage 508 (FIG. 5)) a record of which output devices have been compared against the user's location (e.g., as they are retrieved from the database) and determine (e.g., via control circuitry 504 (FIG. 5)) that there are no additional output devices stored in the database. Alternatively, the media guidance application may retrieve (e.g., via control circuitry 504 (FIG. 5)) position values for output devices by executing a script that loops over (e.g., using a "for" or "while" loop) every row of a table in the database, where each row contains a different output device. When the end of the table is reached, the script ends and the media guidance application may determine (e.g., via control circuitry 504 (FIG. 5)) that there are no other output devices.

If the media guidance application determines there are more output devices, process 1100 returns to 1108, where the media guidance application retrieves (e.g., via control circuitry 504 (FIG. 5)) another value for the position of another output device from another field in the database. For example, as described above, the media guidance application will continue to compare (e.g., via control circuitry 504 (FIG. 5)) the position of output devices to the location of the user until no more output devices are available to compare.

If the media guidance application determines there are not more output devices, process 1100 continues to 1114, where the media guidance application determines (e.g., via control circuitry 504 (FIG. 5)) based on the comparison of the value for each output device to the location of the first user, which output device is closest to the location of the user. For example, the media guidance application may initialize and store (e.g., in storage 508 (FIG. 5)) a variable for the closest output device to the user. For each output device where a distance or proximity to the location of the user is determined as described above, the media guidance application may compare (e.g., via control circuitry 504 (FIG. 5)) the distance or proximity of the currently compared output device to that of the closest output device stored in memory. If the currently compared output device is closer to the user, the media guidance application may assign (e.g., via control circuitry 504 (FIG. 5)) the currently compared output device to the closest output device variable. The media guidance application may return (e.g., via control circuitry 504 (FIG. 5)) this value corresponding to the output device when no additional output devices are left to compare.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. For example, multiple instances of process 1100 may be executed for each of a plurality of users at a party or in a car to determine the location of each user and an output device closest to each user. Furthermore, it should be noted that any of the devices or equipment discussed in relation to FIGS. 5-6 could be used to perform one or more of the steps in FIG. 11.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   determining a media device among a plurality of media devices configured for a shared listening and/or viewing experience located in a general location;
   determining a media preference for the media device;
   determining a media item from a plurality of media items corresponding to the media preference; and
   generating for delivery the media item to the media device.

2. The method of claim 1, wherein the general location is at least one of a vehicle, a room, a building, a venue, or a predetermined proximity to an output device, and
   wherein each of the plurality of media devices are located within the at least one of the vehicle, the room, the building, the venue, or the predetermined proximity to the output device.

3. The method of claim 2,
   wherein each media device of the plurality of media devices is associated with at least one of a portion of the vehicle, a portion of the room, a portion of the building, a portion of the venue, or a proximity to an output device, and
   wherein the media preference is determined based on the associated at least one of the portion of the vehicle, the portion of the room, the portion of the building, the portion of the venue, or the proximity to the output device.

4. The method of claim 2,
   wherein each media device of the plurality of media devices is associated with at least one of a seat of the vehicle; a seat in the room; a room of the building; a seat, a section, or a deck of the venue; or a proximity to an output device, and
   wherein the media preference is determined based on the associated at least one of the seat of the vehicle; the seat in the room; the room of the building; the seat, the section, or the deck of the venue; or the proximity to the output device.

5. The method of claim 1, comprising in response to determining that the media preference does not correspond with another media preference of another media device of the plurality of media devices, generating an alert notifying the media device to access a second media device to access the media item.

6. The method of claim 1, comprising adjusting an output parameter of the media device when presenting the media item based on the media preference for the media device.

7. The method of claim 1, comprising determining, for each of the plurality of media items, at least one of a title, a genre, an artist, a year, a length, a country of origin, a rating, a keyword, a lyric, an encoding format, a file size, or information about the media item.

8. The method of claim 7, wherein the media preference is based on the at least one of the title, the genre, the artist, the year, the length, the country of origin, the rating, the keyword, the lyric, the encoding format, the file size, or the information about the media item.

9. The method of claim 7, wherein the media device is based on the at least one of the title, the genre, the artist, the year, the length, the country of origin, the rating, the keyword, the lyric, the encoding format, the file size, or the information about the media item.

10. The method of claim 1, comprising adjusting the media preference based on a profile associated with the media device, or a request received by the media device.

11. A system comprising:
    circuitry configured to:
      determine a media device among a plurality of media devices configured for a shared listening and/or viewing experience located in a general location;
      determine a media preference for the media device;
      determine a media item from a plurality of media items corresponding to the media preference; and
      generate for delivery the media item to the media device.

12. The system of claim 11,
    wherein the general location is at least one of a vehicle, a room, a building, a venue, or a predetermined proximity to an output device, and
    wherein each of the plurality of media devices are located within the at least one of the vehicle, the room, the building, the venue, or the predetermined proximity to the output device.

13. The system of claim 12,
    wherein each media device of the plurality of media devices is associated with at least one of a portion of the vehicle, a portion of the room, a portion of the building, a portion of the venue, or a proximity to an output device, and
    wherein the media preference is determined based on the associated at least one of the portion of the vehicle, the portion of the room, the portion of the building, the portion of the venue, or the proximity to the output device.

14. The system of claim 12,
    wherein each media device of the plurality of media devices is associated with at least one of a seat of the vehicle; a seat in the room; a room of the building; a seat, a section, or a deck of the venue; or a proximity to an output device, and
    wherein the media preference is determined based on the associated at least one of the seat of the vehicle; the seat in the room; the room of the building; the seat, the section, or the deck of the venue; or the proximity to the output device.

15. The system of claim 11, wherein the circuitry is configured to: in response to determining that the media preference does not correspond with another media preference of another media device of the plurality of media devices, generate an alert notifying the media device to access a second media device to access the media item.

16. The system of claim 11, wherein the circuitry is configured to adjust an output parameter of the media device when presenting the media item based on the media preference for the media device.

17. The system of claim 11, wherein the circuitry is configured to determine, for each of the plurality of media items, at least one of a title, a genre, an artist, a year, a length, a country of origin, a rating, a keyword, a lyric, an encoding format, a file size, or information about the media item.

18. The system of claim 17, wherein the media preference is based on the at least one of the title, the genre, the artist, the year, the length, the country of origin, the rating, the keyword, the lyric, the encoding format, the file size, or the information about the media item.

19. The system of claim 17, wherein the media device is based on the at least one of the title, the genre, the artist, the year, the length, the country of origin, the rating, the keyword, the lyric, the encoding format, the file size, or the information about the media item.

20. The system of claim 11, wherein the circuitry is configured to adjust the media preference based on a profile associated with the media device, or a request received by the media device.

* * * * *